United States Patent [19]

Yamauchi et al.

[11] Patent Number: 5,749,429
[45] Date of Patent: May 12, 1998

[54] POWER ASSIST APPARATUS OF POWER ASSISTED BICYCLE

[75] Inventors: Kosaku Yamauchi, Shizuoka-ken; Shinobu Tsutsumikoshi; Hisao Nagai, both of Hamamatsu, all of Japan

[73] Assignee: Suzuki Kabushiki Kaisha, Japan

[21] Appl. No.: 623,188

[22] Filed: Mar. 28, 1996

[30] Foreign Application Priority Data

| Apr. 3, 1995 | [JP] | Japan | 7-077769 |
| Jul. 31, 1995 | [JP] | Japan | 7-195587 |
| Sep. 26, 1995 | [JP] | Japan | 7-247739 |
| Sep. 26, 1995 | [JP] | Japan | 7-247740 |
| Sep. 26, 1995 | [JP] | Japan | 7-247741 |
| Sep. 29, 1995 | [JP] | Japan | 7-252773 |
| Oct. 27, 1995 | [JP] | Japan | 7-280689 |

[51] Int. Cl.$^6$ .................................... B62M 7/12
[52] U.S. Cl. .................. 180/205; 180/65.2; 180/220; 180/206
[58] Field of Search ............................ 180/205, 214, 180/216, 220, 65.1, 65.2, 206, 207, 209, 210, 212, 213, 217, 218, 219, 65.8, 65.6, 65.7; 280/214, 215

[56] References Cited

U.S. PATENT DOCUMENTS

| 5,474,148 | 12/1995 | Takata | 180/65.2 |
| 5,501,292 | 3/1996 | Kawashima et al. | 180/220 |

*Primary Examiner*—Douglas C. Butler
*Attorney, Agent, or Firm*—Ronald P. Kananen

[57] ABSTRACT

A power assist apparatus of a power assisted bicycle comprises a crank shaft to be driven for rotation by a pedaling force, an electric motor for generating an assisting power, a force composition device for composing the pedaling force and the assisting power to output a composed force thereof to a driving wheel side and at the same time for generating two thrust component forces having magnitude proportional to pedaling force and assisting power, a thrust component force magnitude difference detector for detecting the difference in magnitude between the two thrust component forces, and a controller for controlling an output of the electric motor so as to bring the difference in magnitude between the two thrust component forces to "0" and to an optional magnitude difference based on an input from the thrust component force magnitude difference detector.

21 Claims, 26 Drawing Sheets

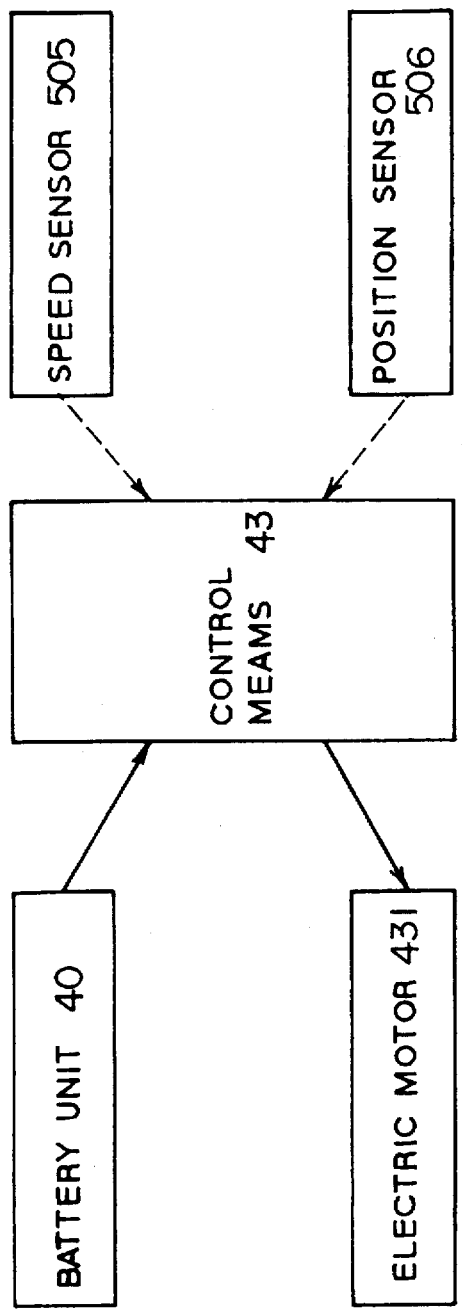

5,749,429

POWER ASSIST APPARATUS OF POWER ASSISTED BICYCLE

BACKGROUND OF THE INVENTION

1. Field of the Invention

The present invention relates to a power assisted bicycle having an electric motor mounted on a body of the bicycle for assisting a pedaling force by an assisting power thereof to make easier climbing along a slope and riding against a wind and, more particularly, relates to a power assist apparatus to be mounted on the power assisted bicycle as a single unit incorporating the electric motor.

2. Prior Art

The power assist apparatus of such power assisted bicycle has a force composition device which composes the pedaling force applied on a crank shaft and the assisting power of the electric motor and transmits the composed force to a driving wheel. Conventionally, a planetary gear or differential gear is widely used as the force composition device.

In composing the pedaling force and the assisting power by the force composition device, it is necessary to control an output of the electric motor so that an assist ratio by the assisting power, i.e., the ratio of the pedaling force to the assisting power be constant at all times, preferably at an assist ratio of 1 to 1, thereby providing an innate physical sensation of pressing the pedal to keep a good feeling of operating the power assisting bicycle. Here a special caution is necessary so that the assisting power never exceeds the pedaling force.

In a conventional system, the pedaling force is detected by an exclusive detection means (e.g., a torque sensor) and a signal therefrom is input to control means (e.g., a small-size CPU). The control means set a current level flowing to the electric motor in accordance with the pedaling force, thereby controlling the output of the electric motor to achieve the assist ratio of 1 to 1 at all times.

However, a slight difference occurs by each individual unit, for example, in the accuracy of the detection means for detecting the pedaling force, an output characteristic of the electric motor with respect to the current value or a friction loss of the force composition device, etc. When these slight differences are added together, the assist ratio is susceptible to change.

Therefore, in order to accurately set the 1-to-1 assist ratio, a strict total check is necessary of the accuracy of the pedaling force detection means, the output characteristic of the electric motor and the friction loss of the force composition device, etc. After assembling all of these component parts, the output of the electric motor must be checked again. When such assembling method is adopted, a large increase in cost and lower productivity cannot be avoided.

In addition, even if the assist ratio is 1-to-1 under the condition of a new bicycle where a battery is correctly charged, the assisting power exceeds the pedaling force when the output of the electric motor is increased as the battery is accidentally overcharged or when the output of the electric motor is relatively increased as the friction loss of the force composition device is reduced after a fitting ride. Thus the 1-to-1 assist ratio is not always certain.

An assisting power exceeding the pedaling force not only results in an unnatural feeling when riding the power assisting bicycle but also brings an unexpected accelerating force to the rider. In order to avoid such condition, it is necessary to previously set the output of the electric motor to a relatively low level so that the assisting power does not exceed the pedaling force even when the battery is overcharged or when the friction loss of the force composition device is reduced.

If, however, the output of the electric motor is set to a relatively low level as a provision against the case of an overcharged battery or of reduced friction loss of the force composition device, the output of the electric motor becomes too low when the battery is correctly charged or when the bicycle is new where the friction loss of the force composition device is relatively large. In this case, the 1-to-1 assist ratio cannot be also maintained. It should be noted that, when the voltage of the battery has been lowered, the output of the electric motor is further weakened and the assist ratio is further reduced.

In addition to the above problems, the force composition device in the conventional power assist apparatus has a complicated and expensive structure using a planetary gear or differential gear, resulting in a disadvantage that the power assist apparatus is increased in size and weight and that its manufacturing cost is high.

SUMMARY OF THE INVENTION

The present invention was conceived to solve the problems encountered in the prior art described above and it is a first object of the present invention to provide a power assist apparatus of a power assisted bicycle in which the assist ratio by the assisting power of an electric motor can be accurately controlled to 1 to 1 or to an optional ratio.

It is a second object of the present invention to provide a power assist apparatus of a power assisted bicycle capable of improving productivity and operability as well as durability of a force composition device while attempting a reduction in size and weight of the force composition device by simplifying the structure thereof and at the same time to reduce as mush as possible the pedaling force at the time of riding only by human power.

It is a third object of the present invention to provide a power assist apparatus of a power assisted bicycle to improve the attaching precision of the electric motor with respect to the casing of the power assist apparatus and at the same time to attempt a reduction in size and an improvement in aesthetic appearance of the casing and electric motor and moreover to achieve a reduction in the number of processing steps of the outer case of the electric motor and a prevention of warping thereof.

It is a fourth object of the present invention to provide a power assist apparatus of a power assisted bicycle to improve an assemblability of the casing of the power assist apparatus while reducing the processing cost of a casing, and at the same time to improve the aesthetic appearance of the power assist apparatus by, to the greatest extent possible, preventing an exposure of the head portion of case fixing bolt to be used for the assembly of the casing.

It is a fifth object of the present invention to provide a power assist apparatus of a power assisted bicycle to keep narrow the lateral width of a reduction gear train for transmitting the assisting power of the electric motor to the force composition device and at the same time to prevent an occurrence of mechanical loss or gear noise.

It is a sixth object of the present invention to provide a power assist apparatus of a power assisted bicycle to keep smooth the rotation of the sun roller of a planetary speed reducing device for reducing the speed of assisting power of the electric motor, to control bearing noise thereof and to prevent an occurrence of gear noise at the portion of a primary drive gear provided on a reduction carrier.

These and other objects can be achieved according to the present invention, in one aspect, there is provided a power assist apparatus of a power assisted bicycle, which comprises a crank shaft to be driven for rotation by a pedaling force, an electric motor for generating an assisting power, a force composition device for composing the pedaling force and the assisting power to output the composed force thereof to a driving wheel side and at the same time for generating two thrust component forces having magnitude proportional to the pedaling force and the assisting power, a thrust component force magnitude difference detection means for detecting the difference in magnitude of the two thrust component forces, and a control means for controlling an output of the electric motor to bring the difference in magnitude between the two thrust component forces to "0" and to an optional difference in magnitude based on an input from the thrust component force magnitude difference detection means.

According to this construction, since the assist ratio is directly and mechanically detected at the portion of the force composition device where the pedaling force and the assisting power are composed. The assist ratio may thus be accurately determined without an error. In addition, since the assist ratio is set to 1 to 1 or to an optional magnitude difference based on the net output of the electric motor, the effect on the assist ratio for example due to dispersion of the output characteristic of the electric motor, the charged state of the battery or a change in friction loss before and after a fitting operation may be completely ignored so that an accurate control of the assist ratio is possible.

In the power assist apparatus of the power assisted bicycle according to the present invention, the force composition device comprises an output rotating member for transmitting an output to the driving wheel side, a force composition rotating member provided as rigidly rotatable with the output rotating member and axially movable with respect thereto, a pedaling force transmitting member and an assisting power transmitting member supported on two sides of the force composition rotating member for respectively receiving the pedaling force and the assisting power for rotation in the same direction, a torque cam for transmitting the rotating forces of the pedaling force transmitting member and the assisting power transmitting member to the force composition rotating member and at the same time for causing two thrust component forces having magnitude proportional to the pedaling force and the assisting power to act upon the force composition rotating member from two sides thereof, and a coil spring for urging the force composition rotating member to a neutral position on the output rotating member. The thrust component force magnitude difference detection means is provided as a position sensor for detecting and inputting to the control means displacement direction and displacement amount of the force composition rotating member from said neutral position.

According to this construction, the pedaling force transmitting member and the assisting power transmitting member supported on the two sides of the force composition member are rotated in the same direction upon respectively receiving the pedaling force and the assisting power, such rotating forces being transmitted to the force composition member through the torque cam. For this reason, the force composition member is rotated together with the output shaft, and the rotating force of the output shaft is output to the driving wheel side as a composed force of the pedaling force and the assisting power.

When in a complete stop, the force composition member is located at the neutral position on the output shaft due to the urging force of the coil spring. Then, at the same time of transmitting of the pedaling force and the assisting power, two component forces having magnitude proportional to the pedaling force and the assisting power are applied by means of the torque cam to the force composition member as a thrust load from the two sides of the force composition member.

In the case where the assist ratio is 1 to 1, i.e., when the respective magnitudes of the pedaling force and the assisting power are even, the magnitudes of the two component forces applied from the two sides of the force composition member are also even and are offset by each other so that the position of the force combining member is kept at the neutral position. However, if the assist ratio is not 1 to 1, the force composition member is moved in the axial direction of the output shaft by the component force having higher intensity because the magnitudes of the two component forces become uneven.

Then, the component force magnitude difference detection means as a position sensor for the force composition member detects and inputs to the control means the displacement direction and displacement amount of the force composition member from its neutral position. Based on such input, the control means calculates the difference between the two component forces and controls the output of the electric motor so as to bring the difference to "0" or to an optional magnitude difference.

According to this construction, since the structure of the force composition device becomes very simple, it is possible to improve the productivity of the force composition device and and at the same time to attempt a reduction in size and weight of the force composition device.

In the power assist apparatus of the power assisted bicycle according to the present invention, the output rotating member is constructed in shape of a cylinder provided on an outer circumference of the crank shaft for rotation with respect thereto.

With this construction, the force composition device as a whole is positioned coaxially with the crank shaft so that it is greatly compacted. In addition, in the case of riding only by human power without operating the electric motor, since the output shaft is rotated together with the crank shaft, the rotating resistance thereof is smaller compared with the case where the output shaft is provided on a separate axis from the crank shaft, thereby greatly reducing the pedaling force.

A power assist apparatus of a power assisted bicycle according to another aspect of the present invention includes a crank shaft to be driven for rotation by a pedaling force, an electric motor for generating an assisting power, and a force composition device for composing the pedaling force and the assisting power to output a composed force thereof to a driving wheel side, the force composition device comprising an output rotating member supported on the crank shaft for transmitting the composed force of the pedaling force and the assisting power to the driving wheel side, a force composition rotating member provided through a ball spline to be rigidly rotatable with the output rotating member and to be movable in the axial direction thereof, a torque cam for transmitting the pedaling force and the assisting power to the force combining rotating member and at the same time for causing two thrust component forces having magnitude proportional to the pedaling force and the assisting power to act upon the force composition rotating member from two sides thereof along the axial direction of the crank shaft, a coil spring for maintaining the force composition rotating member at a neutral position within the range of its axial movement, the coil spring being disposed on an inner circumferential side in the diametrical direction than the torque cam, movement detection means for detecting displacement direction and displacement amount from its neutral position of the force composition rotating member upon receiving the two thrust component forces, and a control means for detecting the difference in magnitude between the two thrust component forces based on an input from the movement detection means and for controlling an output of the electric motor so as to bring the difference in magnitude to "0" and to an optional magnitude difference.

According to this aspect of the present invention, since the structure becomes very simple with the force composition device constructed as described, it is possible to achieve an improvement in productivity and a compact construction of the force composition device. Especially, since the urging means of the force composition device is disposed on an inner circumference in diametrical direction than the component force generation means, it is possible to effectively reduce the size of the urging means, thus greatly making compact the force composition device. Further, in the power assist apparatus of the power assisted bicycle according to the present invention, the ball spline of the force composition device is disposed on a diametrically outer circumference than the torque cam and the coil spring.

In this manner, the diameter of the ball spline can be increased so that the torque to be applied to the ball spline can be reduced to make smooth the operation of the ball spline. Since, as a result, the operation of the torque cam also becomes smooth, the operability and durability of the force composition device may be greatly improved.

Furthermore, a power assist apparatus of a power assisted bicycle according to a further aspect of the present invention includes a crank shaft to be driven for rotation by a pedaling force, an electric motor for generating an assisting power and a force composition device for composing the pedaling force and the assisting power to output the composed force thereof to a driving wheel side, the force composition device comprising an output rotating member supported on the crank shaft to transmit the composed force of the pedaling force and the assisting power to the driving wheel side, a force composition rotating member provided to be rigidly rotatable with the output rotating member and to be axially movable with respect thereto through a ball spline, a pedaling force transmitting member for transmitting the pedaling force to the force composition rotating member, an assisting power transmitting member for transmitting the assisting power to the force composition rotating member, a torque cam for transmitting the pedaling force from the pedaling force transmitting member to the force composition rotating member and at the same time for causing a thrust component force having magnitude proportional to the pedaling force to act on the force composition rotating member from one side thereof along the axial direction of the crank shaft, a torque cam for transmitting the assisting power from the assisting power transmitting member to the force composition rotating member and at the same time for causing a thrust component force having magnitude proportional to the assisting power to act on the power composition rotating member from the other side thereof along the axial direction of the crank shaft, a coil spring for maintaining the force composition rotating member at a neutral position within its axial movement range, a movement detection means for detecting displacement direction and displacement amount from the neutral position of the power composition rotating member axially moved upon receiving the two thrust component forces, and a control means for detecting the difference in magnitude between the two thrust component forces based an input from the movement detection means and for controlling an output of the electric motor so as to bring the difference in magnitude to "0" and to an optional magnitude difference. The torque cam comprises a cam roller rotatably provided on the pedaling force transmitting member and the assisting power transmitting member, rotating axis thereof being orthogonal to the crank shaft, and a cam groove formed in a spiral direction on the force composition rotating member for engagement with the cam roller.

Since, in this manner, the torque cams for transmitting the pedaling force and the assisting power to the force composition rotating member are each constructed as a roller type, resistance at the time of operation of each torque cam becomes very small, thereby making possible a more accurate control on the assist ratio.

Furthermore, the power assist apparatus of the power assisted bicycle is constructed such that a bearing surface provided on the pedaling force transmitting member and a bearing surface provided on the assisting power transmitting member are positioned to have a separation from each other in the axial direction of the crank shaft, the force composition rotating member being supported so as to extend between the two bearing surfaces.

In this manner, shifting of axis of the force composition rotating member as a whole with respect to the crank shaft is minimized to make the detection of position of the force composition rotating member more accurate. It is thus possible to grasp more accurately the magnitudes of the pedaling force and the assisting power applied on the force composition device.

Further, in the power assist apparatus of the power assisted bicycle according to the present invention, the ball spline constituting portion and the cam constituting portion of the force composition rotating member are formed as separate members from each other and the ball spline constituting portion and the cam constituting portion are assembled by tightening screws.

In this case, different materials may be used for the ball spline constituting portion and the cam constituting portion to select a suitable material for each, thereby greatly improving durability of the force composition device. Further, since the ball spline constituting portion and the cam constituting portion are assembled by using screws, they may be easily dismantled and it is possible to use different materials for the respective portions while maintaining the capability of dismantlement and assembly of the force composition device.

Furthermore, in the power assist apparatus of the power assisted bicycle, the portion for screwing of the ball spline constituting portion and the cam constituting portion of the force composition rotating member is located on an outer circumference of the bearing surface on the pedaling force transmitting member.

It is thus possible to efficiently use a dead space within the force composition device to prevent an increase in the size of the force composition device.

In accordance with a further aspect of the present invention, there is provided a power assist apparatus of a power assisted bicycle incorporating an electric motor provided at the interior of a casing, the power assist apparatus comprising a motor fixing bolt being inserted from an inner side of the electric motor into an attaching seat surface provided on an end portion of an outer case of the electric motor, the motor fixing bolt being put through an electric motor fixing wall portion provided within the casing after restricting axial movement and turning of the motor fixing bolts with respect to the outer case, and a nut being tightened onto the motor fixing bolt from the opposite side of the electric motor fixing wall portion to secure the electric motor at the interior of the casing.

According to this construction, the attaching precision of the electric motor can be improved to prevent such disadvantages as an uneven wear, occurrence of unusual sound and increase in mechanical loss at the joint portion of a main shaft of the motor and a drive shaft. Further, the fact that torque due to the driving reaction force of the electric motor is received by the motor fixing bolt as a shearing load results in an advantage in strength. The diameter of the motor fixing bolt is thus smaller and the motor fixing bolt may be greatly reduced in length so that it is possible to achieve compacting of the motor fixing bolt. In addition, since such component parts as an attaching bracket do not project from the outer circumference of the electric motor and such component part do not project from the outline of the casing of the power assist apparatus, it is possible to achieve a reduction in size and an improvement in aesthetic appearance of the casing.

Further, in the power assist apparatus of the power assisted bicycle according to the present invention, the motor fixing bolt is disposed between a plurality of magnets provided on an inner circumferential portion of the outer case of the electric motor.

For this reason, the head portion of the motor fixing bolt and the magnet can be provided in an overlap when they are seen in a plan view. It is thereby possible to provide the motor fixing bolt without increasing the width of the outer case or without sacrificing the width of the magnet so that an increase in size of the outer case and a lowered performance of the electric motor can be prevented.

Furthermore, in the power assist apparatus of the power assisted bicycle, the motor fixing bolt is disposed at an outermost circumferential portion of the attaching seat surface, and one side surface of the head portion of the motor fixing bolt is provided in proximity to the inner circumferential surface of the outer circumferential wall of the outer case of the electric motor to thereby restrict the rotation of the motor fixing bolt.

The rotation of the motor fixing bolt may thus be restricted without depending on a joining means such as welding, thereby preventing an increase in processing steps and occurrence of warping due to heat of the outer case.

In a still further aspect of the power assist apparatus of the power assisted bicycle according to the present invention includes a casing for accommodating an electric motor constituted by a center case positioned at a center in the direction of width of the bicycle body and two side cases secured by case fixing bolts to the left and right sides of the center case, a drive sprocket for driving a rear wheel being provided on one side of the casing, the power assist apparatus of the power assisted bicycle comprising a female thread formed on an inner side of the side case positioned on the side opposite to the drive sprocket, and the case fixing bolt penetrating through the center case and tightened into the female screw as inserted from the side case on the drive sprocket side, thereby fixing the center case and the left and right side cases to each other.

According to this construction, the number of female threads to be formed on the casing can be reduced to one half to greatly reduce the processing cost of the casing. Further, it is not necessary at the time of assembly of the casing to attach the left and right side cases while, as in a conventional example, placing the casing upside down so that the assemblability of the casing can be greatly improved. Furthermore, since the case fixing bolts are inserted and tightened into the casing from the drive sprocket side, the respective heads of half the number of case fixing bolts are covered by such component parts as the drive sprocket and chain cover. For this reason, exposure to the outside of the head of the case fixing bolt is prevented as much as possible so that the aesthetic appearance of the casing is improved and, in addition, it is less likely that the head of the case fixing bolt interferes with a leg or clothes of the rider.

In accordance with the present invention, there is further provided the power assist apparatus of the power assisted bicycle including a reduction gear train having an intermediate shaft rotatably supported by bearings at the two ends thereof, and a gear supported on the intermediate shaft through a one-way clutch, the power assist apparatus of the power assisted bicycle comprising a boss portion of the gear extending toward the bearing for supporting one end of the intermediate shaft, wherein the bearing is provided on an outer circumference of the boss portion and the one-way clutch is provided on an inner circumference of the boss portion.

According to this construction, the gear shaft may be made shorter by overlapping the bearing and the one-way clutch in the axial direction to keep narrow the width of the reduction gear train. Further, since a wide space can be secured for disposing the one-way clutch, a bearing roller train may be provided on the both sides of the one-way clutch to reduce the rotating resistance at the time of racing of the gear shaft within the gear, thereby making mechanical loss very small. At the same time, an occurrence of gear noise may be effectively repressed by preventing an eccentricity and inclination of the gear shaft and gear.

Furthermore, in accordance with the present invention, there is provided a power assist apparatus of a power assisted bicycle including a planetary speed reducing device having a sun roller rotatably supported on the center of a ring roller of which rotation is restricted, a plurality of planet rollers placed between the inner circumferential surface of the ring roller and the outer circumferential surface of the sun roller, a reduction carrier for supporting these planet rollers provided as coaxially with the sun roller and rotatable with respect thereto, and a primary drive gear fixed to the reduction carrier for rigid rotation therewith. The power assist apparatus of the power assisting bicycle comprises a support shaft connected to one end of the sun roller, an intermediate bearing provided between the support shaft and the sun roller to maintain the sun roller and the support shaft coaxially and rotatable with respect to each other, an end portion of the sun roller opposite to the support shaft and an end portion of the support shaft opposite to the sun roller being supported respectively by an end bearing, and the reduction carrier and the primary drive gear provided to be rigidly rotatable on the support shaft.

With such construction, the end of the sun roller toward the support shaft is supported doubly by the intermediate bearing and the end bearing. Due to multiplication of the bearing clearance of the two bearings, the axis of the sun roller is allowed to move to some extent in a direction perpendicular to the axial direction. For example, even when the center of the ring roller is eccentric with respect to the end bearings at the two ends, the eccentricity of the ring roller is absorbed by a displacement of the axis of the sun roller so that the sun roller may be rotated smoothly.

For this reason, the positioning precision of the ring roller need not be very high. In addition, the assembling operation is easy, since assembly of the planetary speed reducing device does not require confirming of the ability of rotation of the sun roller in assembling each part. Moreover, since a displacement of the axis of the sun roller becomes possible due to the multiplying effect of the bearing clearance of the two bearings as described, the bearing clearance of each bearing itself can be made smaller. For this reason, an occurrence of bearing noise and a gear noise occurring due to an eccentric rotation of the primary drive gear may be controlled to a low level.

In the power assist apparatus of the power assisted bicycle according to the present invention, while forming the primary drive gear integrally with the support shaft, the reduction carrier is press-fitted onto an outer circumference of the support shaft such that the press-fitted portion of the reduction carrier is shifted with respect to the primary drive gear in the axial direction of the support shaft.

For this reason, no deformation occurs of the shape of teeth of the primary drive gear due to the press fitting pressure of the reduction carrier so that a gear noise may be prevented from occurring.

In accordance with the present invention, there is still further provided a power assist apparatus of a power assisted bicycle including a crank shaft driven for rotation by a pedaling force, an electric motor for generating an assisting power, and a force composition device for composing the pedaling force and the assisting power to output the composed force thereof to a driving wheel side. The the force composition device comprises a substantially cylindrical pedaling force transmitting member supported rotatably and axially stationarily on the crank shaft and having a clutch housing formed at one end thereof, a one-way clutch provided within the clutch housing and transmitting only a forward rotation of the crank shaft to the pedaling force transmitting member, an assisting power transmitting member supported rotatably and axially stationarily on an outer circumference of the end portion opposite to the clutch housing of the pedaling force transmitting member to receive an assisting power from the electric motor, an output rotating member supported rotatably and axially stationarily on the crank shaft to transmit a composed force of the pedaling force and the assisting power to the driving wheel side, a force composition rotating member provided on the output rotating member to be rigidly rotatable therewith and to be axially movable with respect thereto through a ball spline, a torque cam for transmitting the pedaling force and the assisting power to the force composition rotating member and at the same time for causing two thrust component forces having magnitude proportional to the pedaling force and the assisting power to act on the force composition rotating member from two sides thereof along the axial direction of the crank shaft, a pair of coil springs for maintaining the force composition rotating member at a neutral position in its range of axial movement by urging an urging portion of the force composition rotating member from two sides thereof in the axial direction of the crank shaft, and a position sensor for detecting displacement direction and displacement amount from the neutral position of the force composition rotating member moved in the axial direction upon receiving the two thrust component forces, wherein the pair of coil springs are charged into the space between the clutch housing of the pedaling force transmitting member and the assisting power transmitting member so as to place the urging portion of the force composition rotating member between the two coil springs. The power assist apparatus further comprises a control means for detecting the difference in magnitude between the two thrust component forces based on an input from the position sensor and for controlling an output of the electric motor to bring the difference in magnitude to 0 and to an optional magnitude difference.

In this manner, the pair of coil springs of the force composition device are charged into the space between the clutch housing of the pedaling force transmitting member and the assisting power transmitting member such that the urging portion of the force composition rotating member is disposed between the two coil springs. Accordingly, the reaction force of the coil spring does not act on the other rotating members of the force composition device, thereby greatly reducing friction loss of the force composition device.

Furthermore, in the power assist apparatus of the power assisted bicycle according to the present invention, the output rotating member is supported on the crank shaft next to the pedaling force transmitting member, the pedaling force transmitting member being linked to the output rotating member for relative rotation therewith and at the same time so as not to be separated therefrom in the axial direction.

Movement of the pedaling force transmitting member due to play in the axial direction of the crank shaft can thus be prevented to thereby eliminate movement due to play in the axial direction of the force composition flange of the force composition rotating member so that a more accurate assist ratio control is possible.

BRIEF DESCRIPTION OF THE DRAWINGS

Preferred embodiments of the present invention will be made more clear through the following descriptions with reference to the accompanying drawings, in which:

FIG. 21 is a block diagram showing a control system of the power assist apparatus shown in FIG. 16;

DESCRIPTION OF THE PREFERRED EMBODIMENTS

Preferred embodiments of the present invention will be described hereunder with reference to the drawings.

Figure 1:
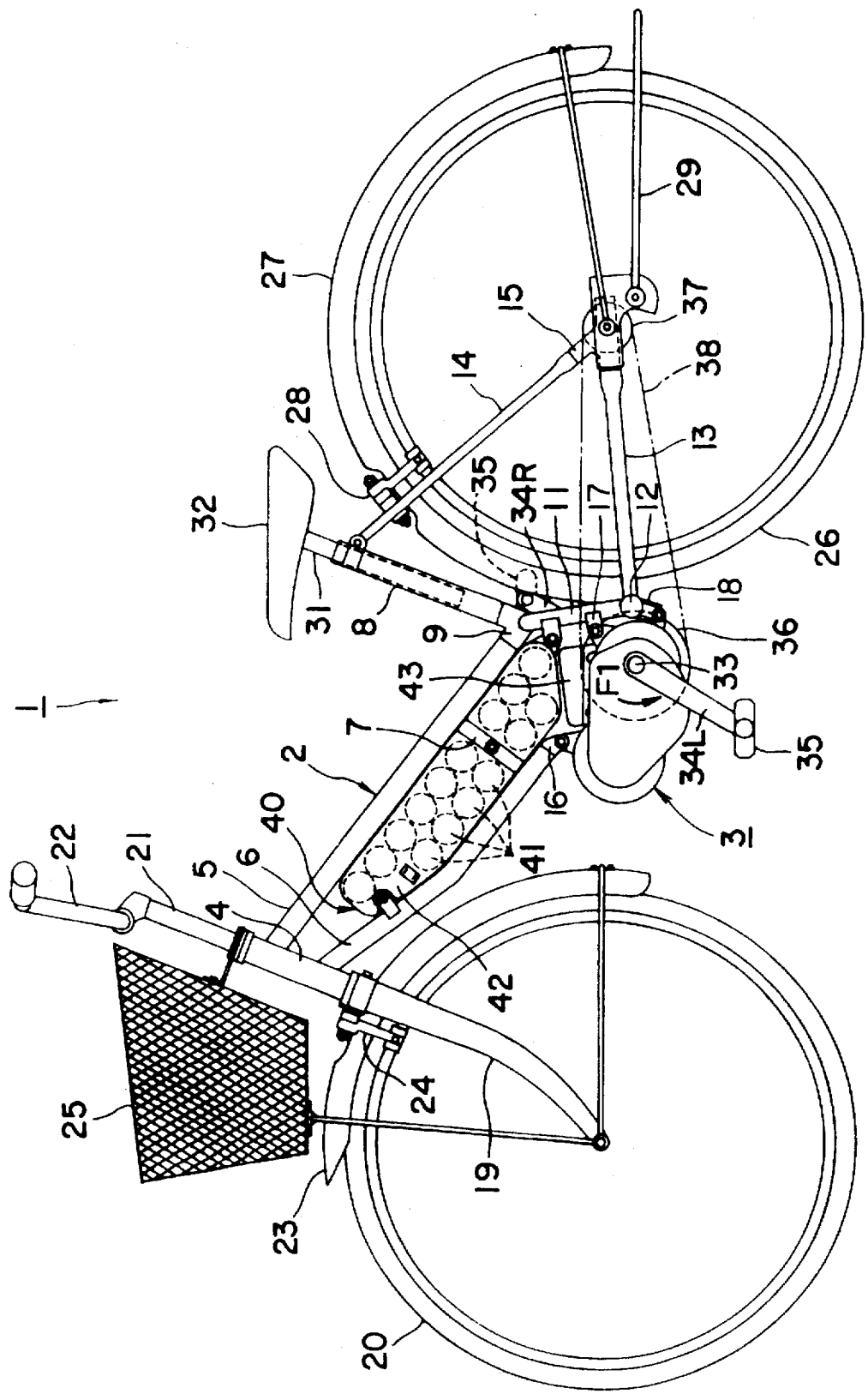
FIG. 1 is a left side view of a power assisted bicycle according to the present invention.

First, FIG. 1 is a left side view of a power assisted bicycle according to the present invention. A power assisted bicycle 1 has a body frame 2 for example made of a metal tube, and a power assist apparatus 3 is mounted on a lower portion of the body frame 2.

The body frame 2 has a head pipe 4 positioned at the front head portion thereof, and an upper tube 5 and a lower tube 6 are extended obliquely downward toward a rear side from the head pipe 4. An intermediate portion of the upper tube 5 and a portion near the rear end of the lower tube 6 are linked with each other by a bridge member 7, and the rear end portion of the upper tube 5 is joined through a seat lug 9 with a lower end portion of a seat tube 8 provided at a steep angle.

A pair of left and right joint tubes 11 are extended downward from the seat lug 9. The lower end portions of the joint tubes 11 are opened toward left and right sides and a chain lug 12 in the shape of a pipe extended in the direction of the body width is secured thereto. Then, a pair of left and right chain stays 13 are extended toward the rear side from the chain lug 12.

On the other hand, a pair of left and right seat stays 14 are extended obliquely downward to the rear side from a portion near the upper end of the seat tube 8. The lower end portions of the seat stays 14 are joined with a rear end portion of the chain stay 13 through a rear end 15.

Attaching brackets 16, 17, 18 are secured to a rear end portion of the lower tube 6, an intermediate portion of the joint tube 11 and a lower portion of the chain lug 12, respectively. The above described power assist apparatus 3 is fixed to the attaching brackets 16, 17, 18 by means of bolts. Thus, the rear end portion of the lower tube 6 is linked with the chain lug 12 through the power assist apparatus 3 so that the power assist apparatus 3 serves also as a structural member of the body frame 2.

A front fork 19 is supported on the head pipe 4 so as to be turnable to the left and right sides, and a front wheel 20 is supported on the lower end portion of the front fork 19. A handle bar 22 is fixed to an upper portion of the front fork 19 through a handle post 21. Provided furthermore on the front fork 19 for rigid rotation therewith are a front fender 23 for covering the front wheel 20, a front brake 24 for braking the front wheel, a basket 25 for carrying articles, etc.

Further, a rear wheel 26 is supported on the above described rear end 15 which is positioned at the rear end portion of the body frame 2. A rear fender 27 for covering the rear wheel 26 is fixed to the chain stay 13, seat stay 14 and rear end 15, and a rear brake 28 for braking the rear wheel is provided on the seat stay 14. It should be noted that a stand 29 for keeping the body upright at the time of leaving the bicycle is provided on the rear end 15.

A seat post 31 is inserted into and fixed in the seat tube 8 from the upper side thereof and a saddle 32 is mounted on an upper end portion of the seat post 31. On the other hand, a crank shaft 33 extended in the direction of the width of the bicycle is supported on the power assist apparatus 3. Crank 34L and crank 34R are fixed to the two end portions of the crank shaft 33 for rigid rotation therewith, and pedals 35 are rotatably provided on the respective terminal end portions of the two cranks 34L, 34R.

Further, the crank shaft 33 provides a shaft for a final drive sprocket 36 positioned on the right side of the assist apparatus 3, a chain 38 is wound around the final drive sprocket 36 and a final driven sprocket 37 which is provided on the rear wheel 26.

The crank shaft 33 is driven to be rotated in a forward rotating direction as indicated by an arrow F1 when the pedal 35 is pressed down by a foot of the rider who is sitting on the saddle 32. At this time, the final drive sprocket 36 is rotated in the same direction as the crank shaft 33, such rotation being transmitted to the final driven sprocket 37 through the chain 38 to drive the rear wheel 26.

A battery unit 40 for actuating an electric motor incorporated in the power assist apparatus 3 is fixed to a portion between the upper tube 5 and the lower tube 6 of the body frame 2. The battery unit 40 is constructed for example such that several small batteries 41 and a charger (not shown) are sealed in a battery case 42 made of a synthetic resin. It should be noted that control means 43 for controlling an output of the electric motor is attached to an upper portion of the power assist apparatus 3.

Figure 2:
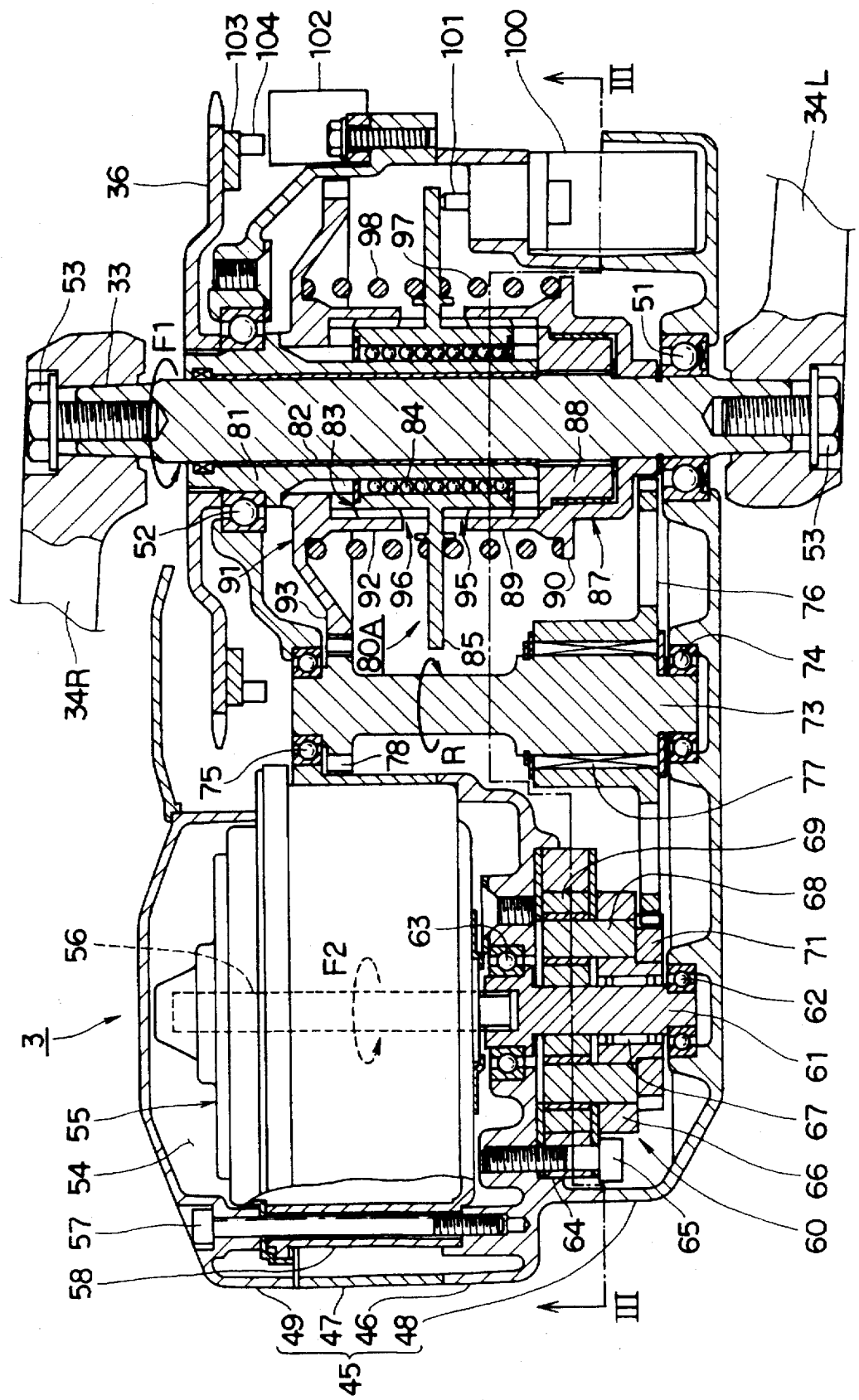
FIG. 2 is a cross sectional view of a power assist apparatus showing a first embodiment of the present invention.
Figure 3:
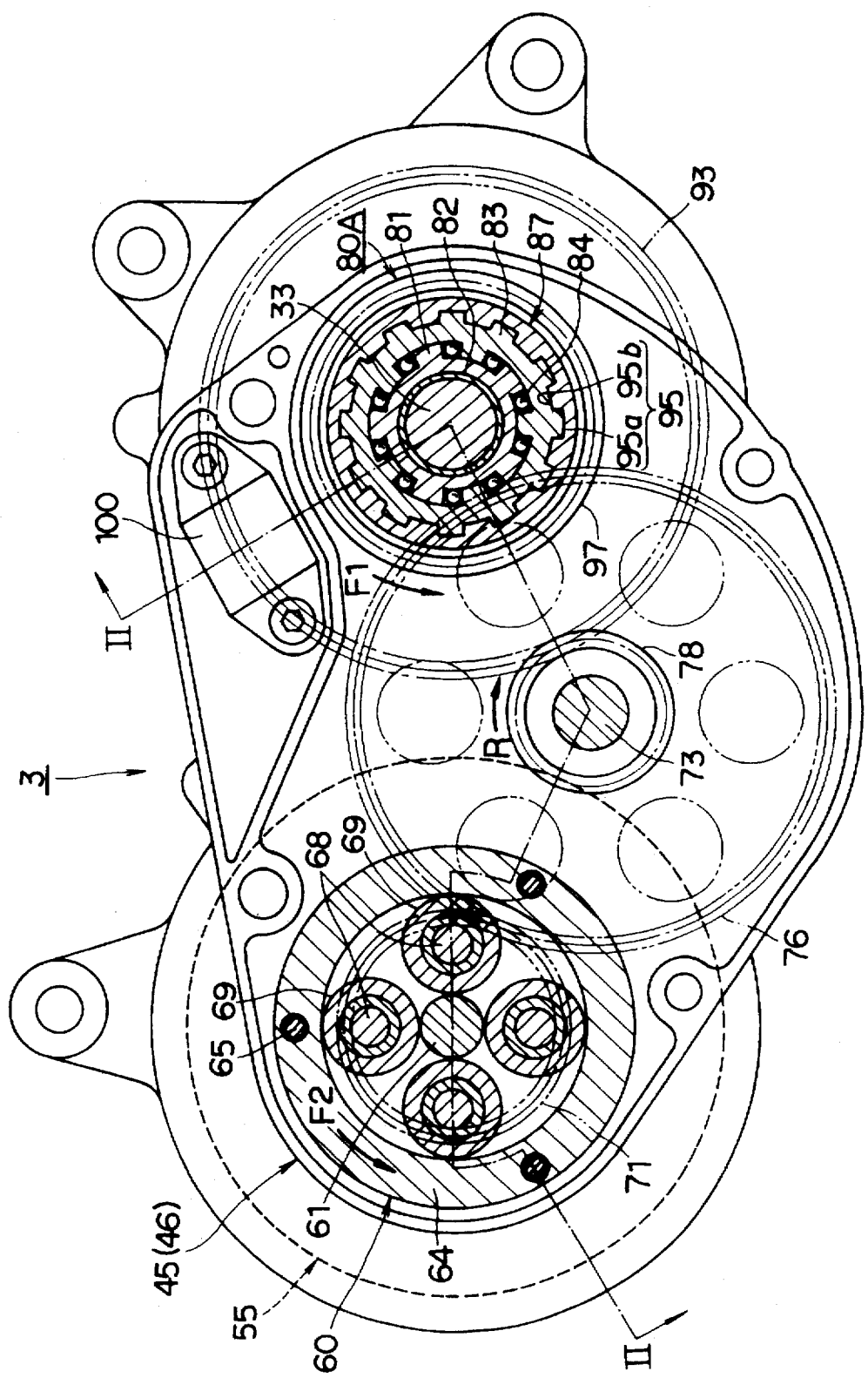
FIG. 3 is a longitudinal sectional view of the power assist apparatus taken along the line III—III of FIG. 2.

FIG. 2 is a cross sectional view of the power assist apparatus 3 showing a first embodiment of the present invention, and FIG. 3 is a longitudinal sectional view of the power assist apparatus 3 seen taken along the line III—III. FIG. 2 is a view developed along the line II—II of FIG. 3.

A casing 45 forming an outer shell of the power assist apparatus 3 is made for example of an aluminum alloy and, as shown in FIG. 2, is constructed by such members as left side case 46 and right side case 47 positioned on an inner side in the body width direction, a left case cover 48 for covering all the left side surface of the left side case 46, and a right case cover 49 to be fixed to the right side of the right side case 47. The state with the left case cover 48 being removed is shown in FIG. 3.

The crank shaft 33 is rotatably supported on a rear portion of the casing 45 using bearings 51, 52. The cranks 34L and 34R are fixed by bolts 53 to two end portions of the crank shaft 33 which protrude to left and right sides from the casing 45.

An electric motor chamber 54 is formed at a front portion of the casing 45, and an electric motor 55 as described above is disposed therein. The electric motor 55 is provided to generate an assisting power, a main shaft 56 thereof being parallel to the crank shaft 33. Several bolts 57 inserted from the right side of the casing 45 penetrate through the right case cover 49 and an outer case 58 of the electric motor 55 and is tightened into the left side case 46. The right case cover 49 and the electric motor 55 are tightened together to the left side case 46 by the bolts 57.

Then, a planetary speed reducing device 60 of the type using rollers is provided on the left side of the electric motor 55. A sun roller 61 of the planetary speed reducing device 60 is formed in which a shaft is supported at the left end thereof by a bearing 62 provided on the left case cover 48 and at the right end thereof by a bearing 63 provided on the left side case 46. At the same time, it is spline-fitted on the left end of the main shaft 56 of the electric motor 55 to be linked therewith for rigid rotation.

Further, an annular ring roller 64 is fixed by means of bolts 65 to the left side case 46, and a reduction carrier 66 is supported on the left side of the ring roller 64 through a bearing 67 for rotation about the sun roller 61. Four roller shafts 68 parallel to the sun roller 61 are formed on the reduction carrier 66 and planet rollers 69 are rotatably supported on the roller shafts 68, respectively. The outer circumferential surface of the four planet rollers 69 is in contact with the inner circumferential surface of the ring roller 64 and the outer circumferential surface of the sun roller 61. Further, a primary drive gear 71 is provided on the left side surface of the reduction carrier 66 for rigid rotation therewith. When the main shaft 56 of the electric motor 55 is rotated, the sun roller 61 of the planetary speed reducing device 60 is also rigidly rotated so that each planet roller 69 revolves about the sun roller 61 while rotating on its own axis between the fixed ring roller 64 and the rotating sun roller 61. Thereby, the reduction carrier 66 and the primary drive gear 71 are driven for rotation at a reduced speed. The main shaft 56 and the sun roller 61 are rotated forward as indicated by an arrow F2, and the reduction carrier 66 and the primary drive gear 71 are also rotated in the same direction.

Incidentally, although, in the present embodiment, the planetary speed reducing device 60 is formed as a roller type, the planetary speed reducing device 60 may also be constructed as a gear type, for example, in which pinion gears are provided on the outer circumference of the sun roller 61, the ring roller 64 is modified to a ring gear (inner-toothed gear), and each planet roller 69 is modified to a planet gear meshed with the pinion gears and ring gear mentioned above.

On the other hand, an intermediate shaft 73 is rotatably supported by means of bearings 74, 75 between the sun roller 61 and the crank shaft 33. The intermediate shaft 73 is parallel to the crank shaft 33, and a primary driven gear 76, having a large-diameter, meshed with the primary drive gear 71 is provided on the left end portion thereof through a one-way clutch 77. Provided on the right end portion thereof for rigid rotation therewith is a secondary drive gear 78 having a small diameter. The primary driven gear 76 is rotated backward as indicated by an arrow R and the one way clutch 77 transmits only the rotation in the R direction of the primary drive gear 76 to the intermediate shaft 73.

Figure 4:
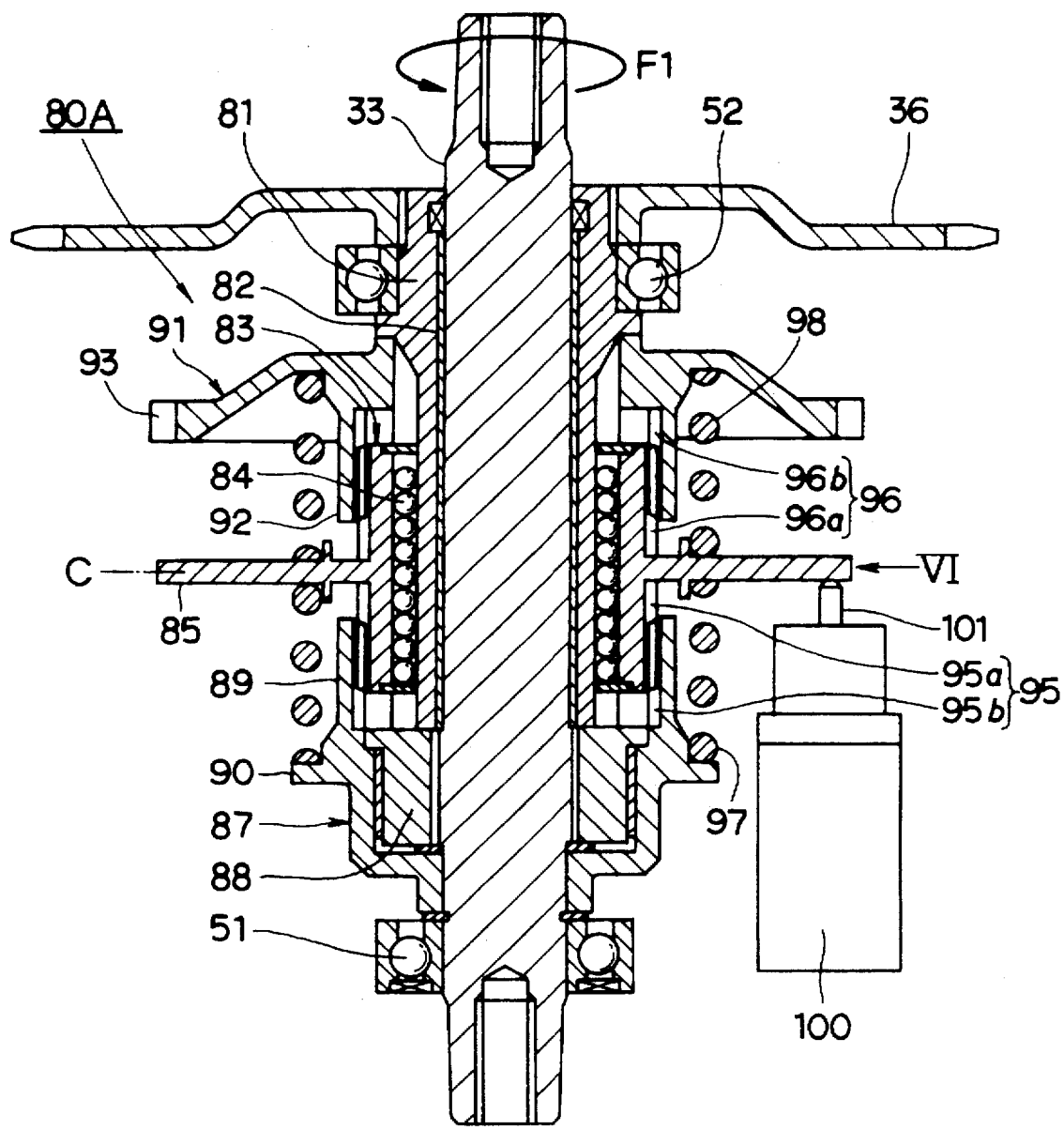
FIG. 4 is an enlarged sectional view showing a first example of a force composition device of the power assist apparatus.

Then a force composition device is provided coaxially with crank shaft 33. FIG. 4 is an enlarged sectional view showing a first example of the force composition device 80A, for example, having the following structure.

First, a cylindrical output rotating member 81 is rotatably supported on an outer circumference of the crank shaft 33 through a metal bearing 82. A right end portion of the output rotating member 81 is projected outward from the casing 45, and the final drive sprocket 36 is fixed to the projecting portion for rigid rotation therewith.

Further, a short cylindrical force composition rotating member 83 is supported on an outer circumference of the output rotating member 81. A ball spline 84 is provided between the force composition rotating member 83 and the output rotating member 81 such that the force composition rotating member 83 is rigidly rotatable with the output rotating member 81 and axially movable with respect thereto. A radially extended flat flange 85 is integrally formed on an intermediate portion of the force composition rotating member 83.

On the other hand, a pedaling force transmitting member 87 is provided on the left side of the force composition rotating member 83. The pedaling force transmitting member 87 is supported on the crank shaft 33 through a one-way clutch 88 and is formed integrally with a sleeve portion 89 for surrounding the force composition rotating member 83 and with a radially extended outer flange 90. Although the one-way clutch 88 transmits the rotation in the F1 direction of the crank shaft 33 to the pedaling force transmitting member 87, it disconnects the connection between the crank shaft 33 and the pedaling force transmitting member 87 to cause racing of the crank shaft 33 when the crank shaft 33 is rotated backward.

Further, an assisting power transmitting member 91 is provided on the right side of the force composition rotating member 83. The assisting power transmitting member 91 is supported rotatably on an outer circumference of the output rotating member 81 and is formed integrally with a sleeve portion 92 for surrounding the force composition rotating member 83 and with a large-diameter secondary driven gear 93. Since the secondary driven gear 93 is meshed with the secondary drive gear 78 of the intermediate shaft 73, the assisting power transmitting member 91 receives the assisting power of the electric motor 55 so as to be rotated in the same F1 direction as that of the pedaling force transmitting member 87.

Figure 6:
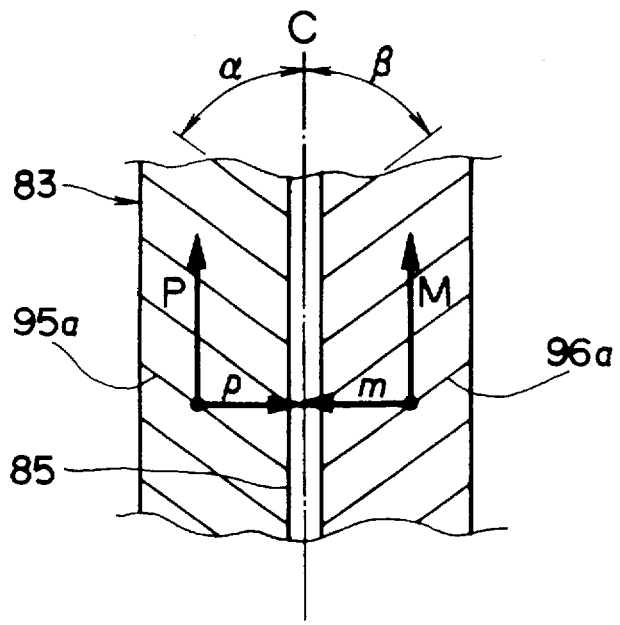
FIG. 6 is a view seen along an arrow VI of FIG. 4.

Then, a torque cam 95 is provided between the force composition rotating member 83 and the pedaling force transmitting member 87, and a torque cam 96 is provided between the force composition rotating member 83 and the assisting power transmitting member 91. For example, as shown in FIG. 6, the torque cam 95, 96 is constituted by an inner cam 95a, 96a in the form of a double helical gear formed on an outer circumferential surface of the force composition rotating member 83, and an outer cam 95b, 96b formed on an inner circumferential surface of the sleeve portion 89, 92 of the pedaling force transmitting member 87 and the assisting power transmitting member 91 for engagement with the inner cam 95a, 96a. The respective directions of the cam inclination of the torque cam 95 and the torque cam 96 are symmetrical with respect to the force composition flange 85, and the angles of inclination $\alpha$ and $\beta$ are set to the same angle.

On the other hand, a coil spring 97 is charged into the space between the force composition flange 85 of the force composition rotating member 83 and the outer flange 90 of the pedaling force transmitting member 87, and a coil spring 98 is charged into the space between the force composition flange 85 and the secondary driven gear 93 of the assisting power transmitting member 91. The two coil springs 97, 98 have the same dimensions and urging force.

The pedaling force transmitting member 87 and the assisting power transmitting member 91 are stationary in the axial direction of the crank shaft 33 and the output rotating member 81, while the force composition rotating member 83 therebetween is axially movable. Thus, when the force composition flange 85 of the force composition rotating member 83 is pressed from the both sides thereof by the urging force of the two coil springs 97, 98 having even urging forces, the urging forces of the two coil springs 97, 98 are balanced and the force composition rotating member 83 is stopped where the force composition flange 85 is position ed at the middle point E between the pedaling force transmitting member 87 and the assisting power transmitting member 91. Such position E is the neutral position of the force composition rotating member 83.

The force composition device 80A is constructed as described above. On the other hand, a position sensor 100 is provided on the casing 45. The position sensor 100 is for example a sensor where displacement amount of an object to be measured is detected by abutting an elastically expandable/contractible measuring piece 101 against the object to be measured. The measuring piece 101 is caused to lightly abut against one side (for example, left side) of the force composition flange 85 which is the object to be measured.

Figure 8:
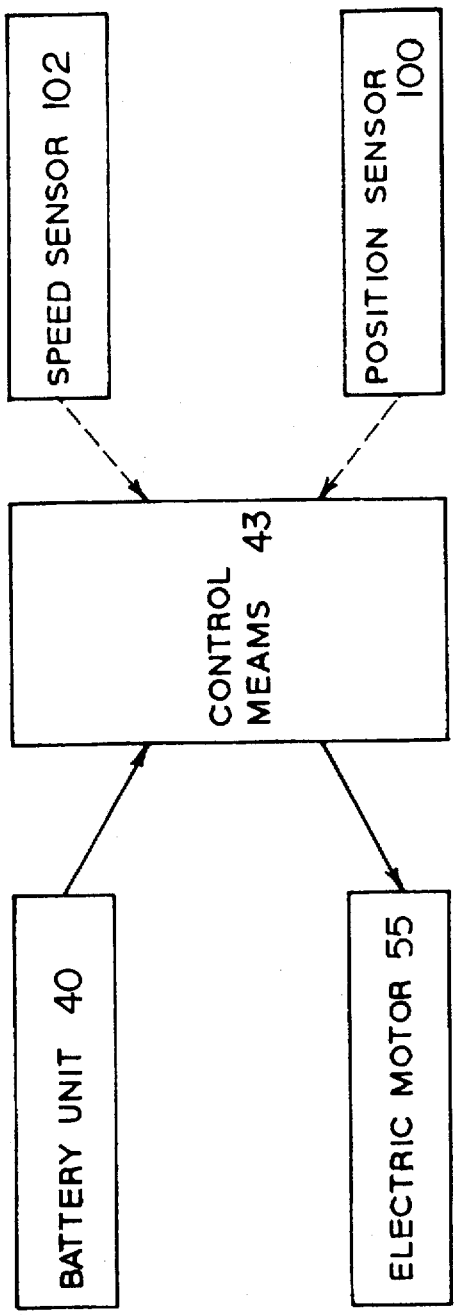
FIG. 8 is a block diagram showing a control system of the power assist apparatus shown in FIG. 2.

As shown in FIG. 8, the position sensor 100 is electrically connected to the control means 43 so that an amount of axial movement of the force composition rotating member 83 based on the measurement by the position sensor 100 is input to the control means 43. The battery unit 40 and the electric motor 55 and a bicycle speed sensor 102 are electrically connected to the control means 43.

The bicycle speed sensor 102 is fixed to the casing 45 and the rotating speed of the final drive sprocket 36, i.e., the bicycle speed of the power assisted bicycle 1 is detected such that the bicycle speed sensor 102 reads the movement of a projection 104 on an annular sensor plate 103 fixed on the inner surface (left side surface as viewed) of the final drive sprocket 36.

At the time of running of the power assisted bicycle 1, the crank shaft 33 is rotated in the F1 direction together with the pedaling force transmitting member 87 upon receiving the pedaling force, and the assisting power transmitting member 91 is also rotated in the F1 direction upon receiving the assisting power of the electric motor 55. The rotating forces of the pedaling force transmitting member 87 and the assisting power transmitting member 91 are transmitted to the force composition rotating member 83 through the torque cam 95, 96, and the force composition rotating member 83 drives the output rotating member 81 for rotation in the F1 direction.

The rotating force of the output rotating member 81 is a composed force of the pedaling force and the assisting power. Such composed force is output to the rear wheel 26 which is a driving wheel through the final drive sprocket 36, the chain 38 and the final driven sprocket 37. Since, in this manner, the pedaling force is assisted by the assisting power of the electric motor 55, it possible to run the power assisted bicycle 1 easily by a relatively small pedaling force.

Since the torque cams 95, 96 are constructed in the manner of a double helical gear, at the same time of transmitting the rotating forces of the pedaling force transmitting member 87 and the assisting power transmitting member 91 to the force composition rotating member 83, they cause thrust component forces p, m having magnitude proportional to pedaling force P and assisting power M as indicated by vector in FIG. 6 to act upon the force composition rotating member 83 from two sides thereof. For this reason, at the same time of transmitting of the pedaling force and the assisting power, the force composition rotating member 83 is pressed from the two sides thereof by the thrust component forces p, m.

If the assist ratio is 1 to 1, i.e., when the pedaling force and the assisting power are even in magnitude, the position of the force composition rotating member 83 is kept at the neutral position E because the magnitudes of the two component forces p, m applied from the two sides of the force composition rotating member 83 also become even and are offset by each other. However, since, if the assist ratio is not 1 to 1, the magnitudes of the two thrust component forces p, m become uneven, the force composition rotating member 83 is moved in the axial direction of the output rotating member 81 due to the thrust component force p or m which is more intense in magnitude. For example, if the pedaling force is more intense than the assisting power, the thrust component force p of the pedaling force becomes more intense than the thrust component force m of the assisting power so that the force composition rotating member 83 (force composition flange 85) is pushed by the thrust component force p and is moved toward the right side from the neutral position E.

Displacement direction and displacement amount from the neutral position E of the force composition rotating member 83 are then detected by the position sensor 100 and are then inputted to the control means 43. The control means 43, based on such input, calculates the difference in magnitude between the two thrust component forces p, m and controls an output of the electric motor 55 so that the difference becomes "0". Then, an assist ratio of 1 to 1 results when the difference in magnitude between the two component forces p, m has become "0". In this manner, the position sensor 100 functions as a thrust component force magnitude difference detection means for detecting the difference in magnitude between the two thrust component forces p, m.

The control means 43 is capable of setting the assist ratio not only to 1 to 1 but also to an optional ratio by desirably setting the difference in magnitude between the two thrust component forces p, m. For example, when the difference in magnitude between the two thrust component forces p and m is set to 1 to 0.5, the assisting power becomes half the pedaling force.

The ratio of difference in magnitude may be continuously changed when driving the bicycle. For example, based on a bicycle speed signal inputted from the bicycle speed sensor 102, the assist ratio is set to a maximum ratio (for example 1 to 1) when starting the power assisted bicycle 1, and the assist ratio is gradually lowered as the bicycle speed is increased. In this manner, power consumption of the electric motor 55 may be greatly saved with reducing the load on the human power, and the running distance may be greatly extended while controlling the discharging amount of the battery unit 40.

Furthermore, the control means 43 reduces or stops power supply to the electric motor 55 when, for example, the bicycle speed has exceeded a certain level so as to avoid an excessive speed of the bicycle.

Figure 5:
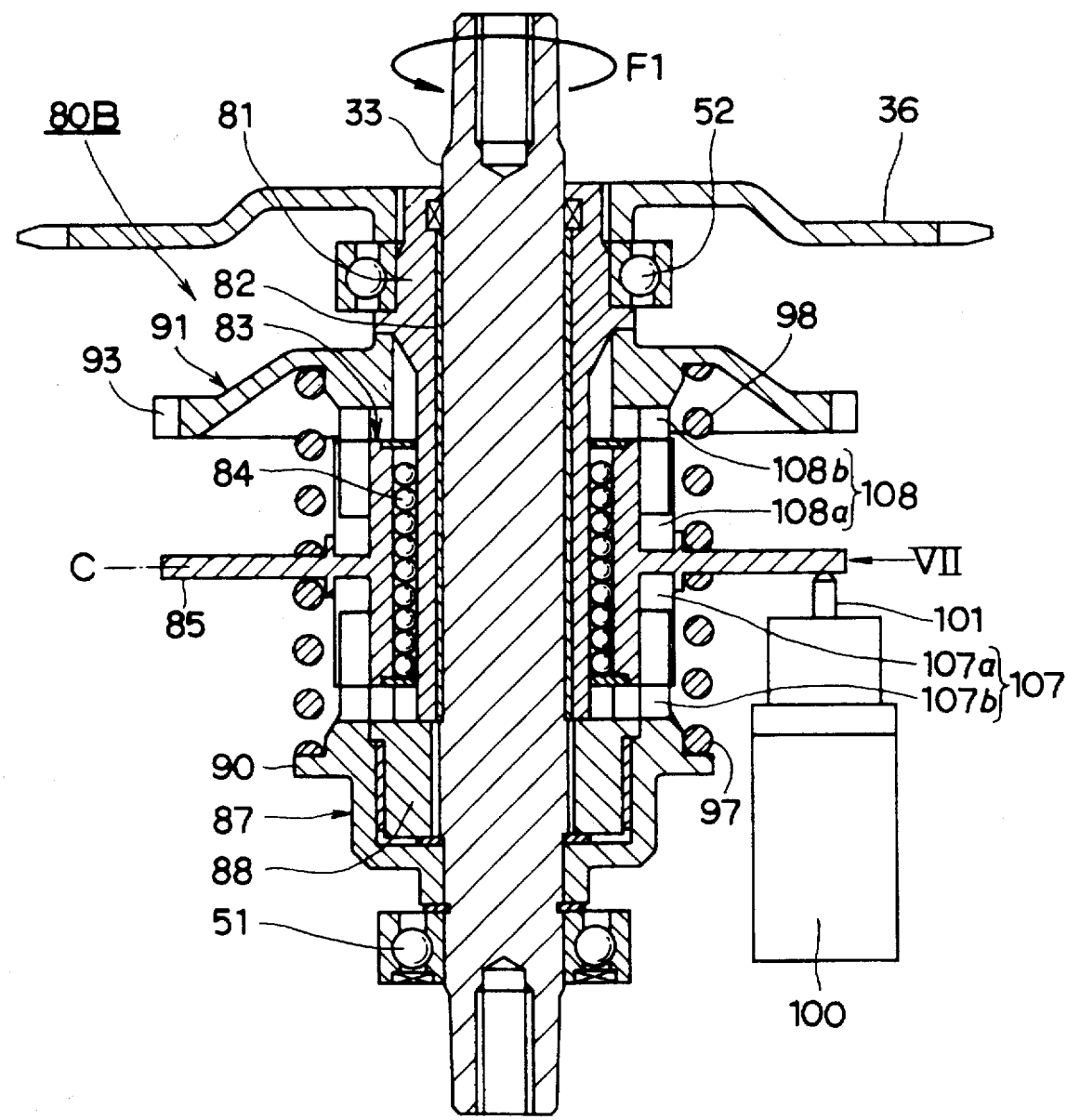
FIG. 5 is an enlarged sectional view showing a second example of the force composition device.

FIG. 5 is an enlarged sectional view showing a second example of the force composition device. Since construction and operation of a force composition device 80B except the portion of torque cam 107, 108 thereof are identical to those of the force composition device 80A of the first example, the identical component parts are denoted by the same reference numerals and will not be described.

Figure 7:
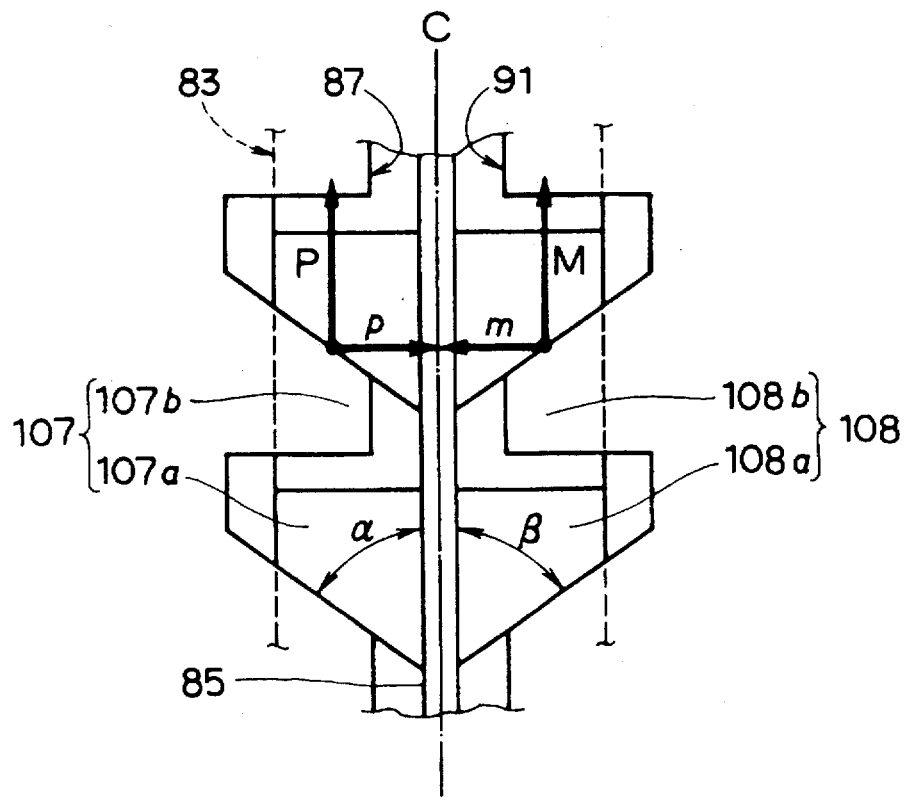
FIG. 7 is a view seen along an arrow VII of FIG. 5.

As shown in FIG. 7, the torque cam 107, 108 of the force composition device 80B is constituted by inner side cam 107a, 108a in the shape of an inclined face cam formed on an outer circumferential surface of the force composition rotating member 83, and outer side cam 107b, 108b formed on the pedaling force transmitting member 87 and the assisting power transmitting member 91 to be meshed with the inner side cam 107a, 108a. The torque cam 107 and the torque cam 108 are inclined symmetrically with respect to the force composition flange 85 with the angles of inclination α and β being set to the same angle.

When the rotating forces of the pedaling force transmitting member 87 and the assisting power transmitting member 91 are to be transmitted to the force composition rotating member 83, at the same time of transmitting pedaling force P and assisting power M to the inner side cam 107a, 108a, the outer side cam 107b, 108b causes thrust component forces p, m having magnitude proportional to the pedaling force P and assisting power M to act upon the force composition rotating member 83 from two sides thereof. Due to the thrust component forces p, m, the force composition rotating member 83 is moved in the axial direction of the output rotating member 81 and, similarly to the case of the first embodiment, an assist ratio thereof is detected by the position sensor 100 and control means 43.

While both the force composition devices 80A and 80B of the first and second embodiment are formed so that the thrust component forces p, m are to press the force composition rotating member 83 from the two sides thereof, they may also be constructed, for example, such that the thrust component forces p, m are to pull the force composition rotating member 83 from the two sides thereof.

According to the structure of the power assisted bicycle 1 described above, since the assist ratio is directly and mechanically detected at the portion of the force composition device 80A, 80B where the pedaling force and the assisting power are composed, it is possible to accurately determine the assist ratio without an error. For this reason, unlike the conventional example, it is not necessary to once detect the pedaling force applied on the crank shaft 33 so as to correspondingly control the output of the electric motor 55. Thus, any detection means for detecting the pedaling force becomes unnecessary.

Accordingly, it is not necessary to consider an error of the pedaling force detection means. In addition, the assist ratio is set to 1 to 1 or to a desired ratio by the net output of the electric motor 55. Thus, the effects on the assist ratio for example due to dispersion in the output characteristic of the electric motor 55, charged state of the battery unit 40 or change in friction loss of the force composition device 80A, 80B before and after a fitting ride may be completely ignored, whereby the assist ratio will be accurately controlled.

In addition, since it is sufficient to read by the position sensor 100 only the difference in magnitude between the thrust component forces p, m which is much smaller than the absolute values of the pedaling force and the assisting power, reading error of the position sensor 100 may be reduced to a very low level. For this reason, an accurate control the assist ratio becomes easier.

Further, since the construction of the force composition device 80A, 80B becomes very simple, it is possible to improve the productivity of the force composition devices 80A, 80B and at the same time to achieve reduction in size and weight of the force composition devices 80A, 80B. Moreover, since the output rotating member 81 is in the form of a cylinder rotatably provided on the outer circumference of the crank shaft 33, the force composition device 80A, 80B as a whole is disposed coaxially with the crank shaft 33. For this reason, it is also possible to achieve reduction in size and weight of the force composition devices 80A, 80B.

When a difference in operating characteristic occurs between the left side torque cam 95, 107 and right side torque cam 96, 108 of the force composition device 80A, 80B or when a difference in urging force occurs between the left and right coil springs 97, 98, there may be a slight shift in the neutral position E of the force composition rotating member 83 which causes a change in the assist ratio. In such a case, however, the assist ratio may be accurately restored to 1 to 1 by simply correcting read value "0" of the position sensor 100 in accordance with the shifted neutral position E. Thus an excellent maintainability is provided.

When the bicycle is run only by human power without actuating the electric motor 55, the crank shaft 33 is rotated in the F1 direction by the pedaling force and the force composition device 80A or 80B and the final drive sprocket 36 are also rotated together with the crank shaft 33 so that the rotation of the final drive sprocket 36 is transmitted to the rear wheel 26. At this time, since the output rotating member 81 is rotated together with the crank shaft 33, the rotating resistance thereof is smaller compared with the case where the output rotating member 81 is constructed on a separate axis from the crank shaft 33. The pedaling force may be greatly reduced.

Figure 9:
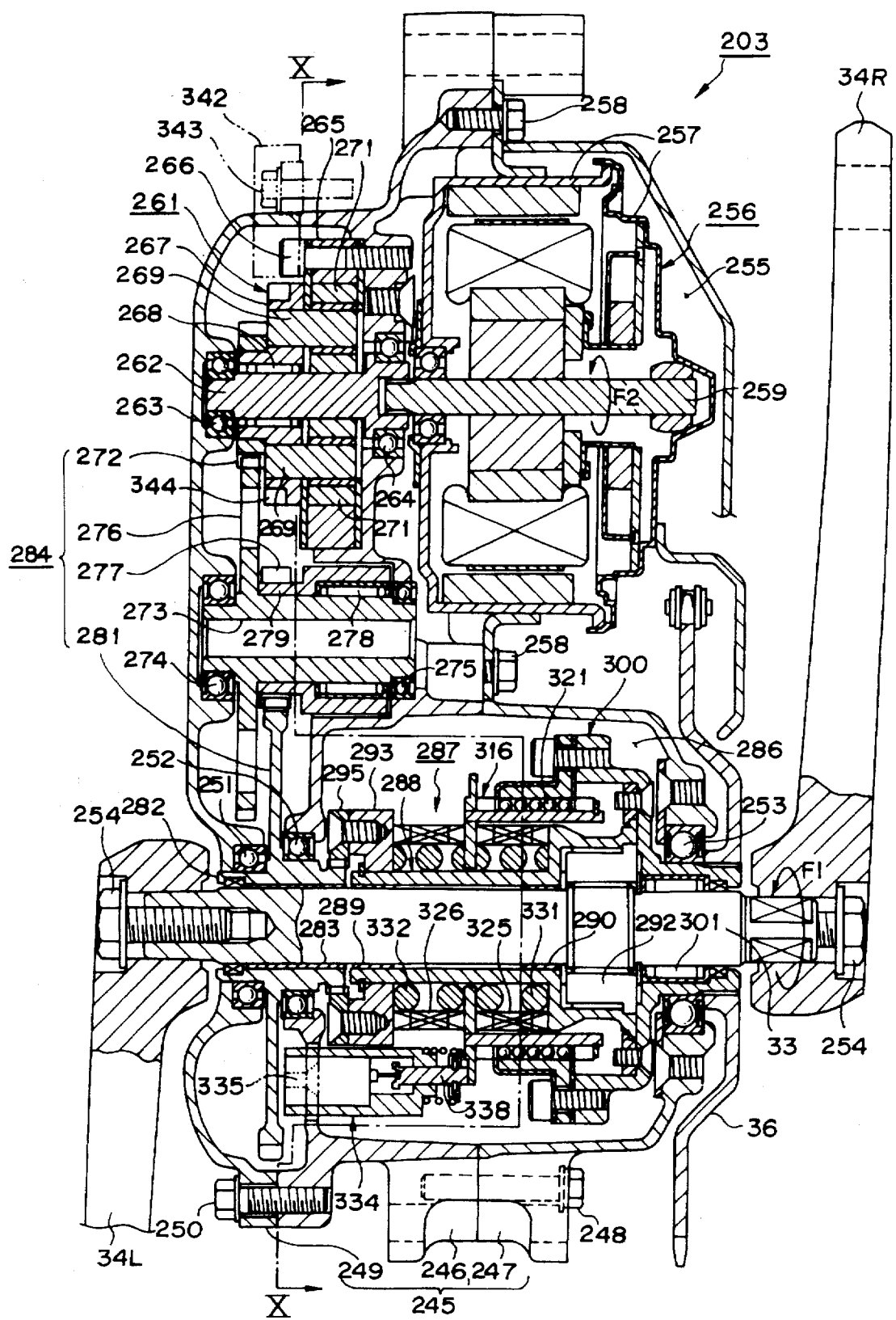
FIG. 9 is a cross sectional view of an power assist apparatus showing a second embodiment of the present invention.
Figure 10:
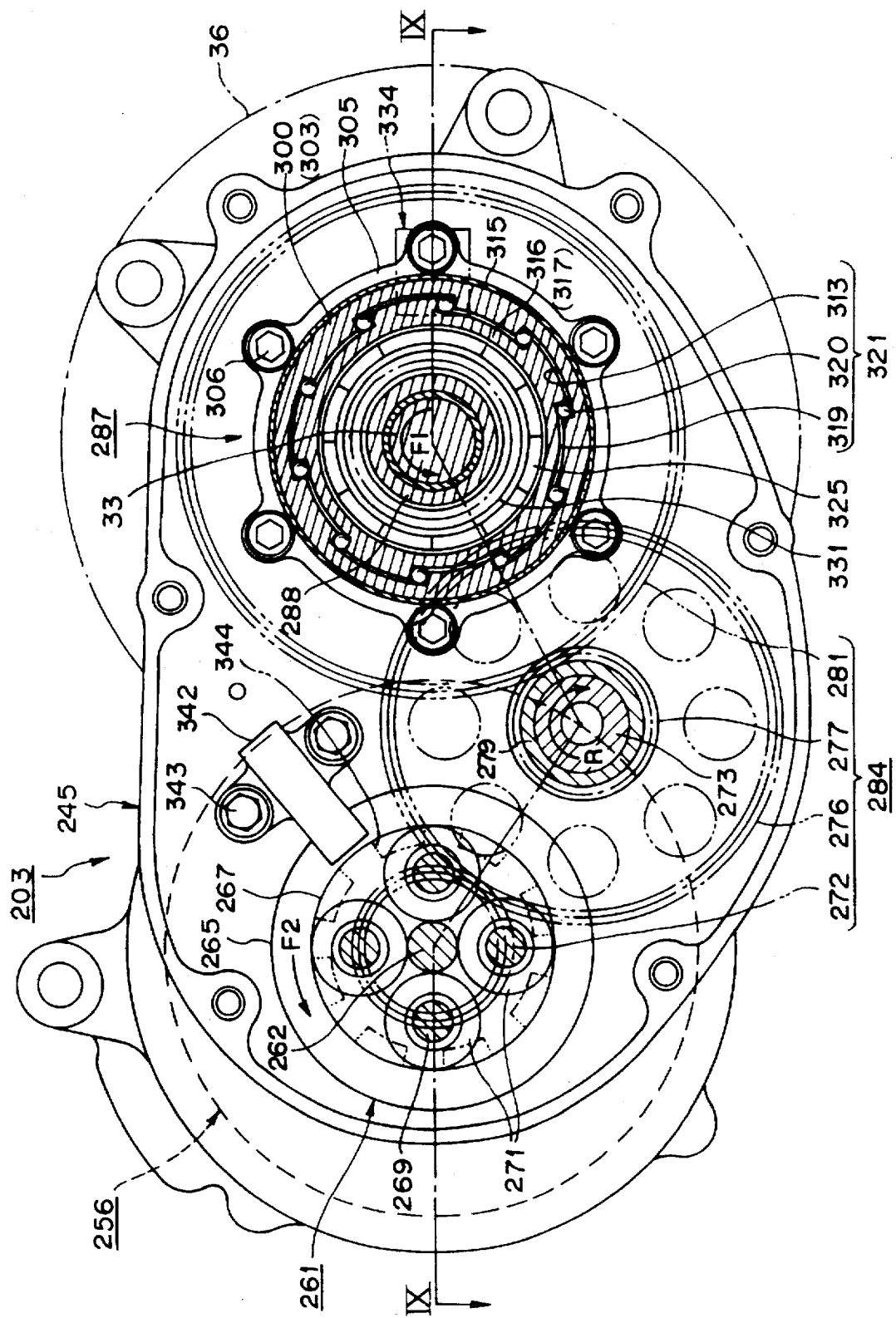
FIG. 10 is a longitudinal sectional view of the power assist apparatus taken along the line X—X of FIG. 9.

FIG. 9 is a cross sectional view of a power assist apparatus 203 showing a second embodiment of the present invention, and FIG. 10 is a longitudinal sectional view of the power assist apparatus 203 as viewed along the line X—X of FIG. 9, which is developed along the line IX—IX of FIG. 10.

Figure 11:
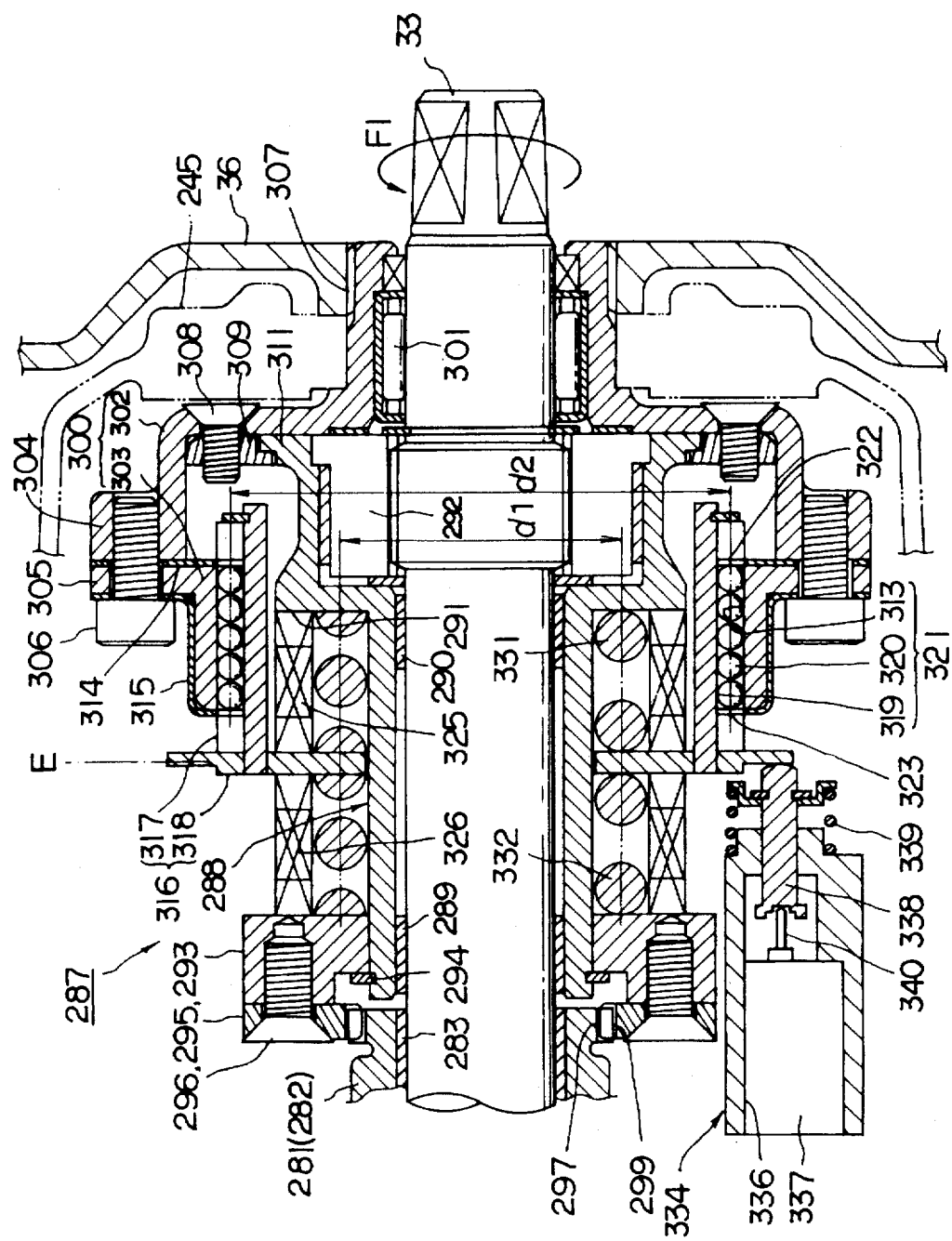
FIG. 11 is an enlarged longitudinal sectional view of the force composition device.

A casing 245 forming an outer shell of the assist apparatus 203 is for example made of an aluminum alloy and, as shown in FIG. 9, is constructed such that a right side case 247 is fixed by means of several case fixing bolts 248 to the right side of a center case 246 positioned at the center in the bicycle width direction and a left side case 249 is fixed by means of several case fixing bolts 250 to the left side of the center case 246. FIG. 11 shows a state that the left side case 249 is removed. The crank shaft 33 is rotatably supported on a rear portion of the casing 245 using bearings 251, 252, 253, and cranks 34L and 34R are fixed by means of bolts 254 to the two end portions of the crank shaft 33 which project toward the left and right sides from the casing 245.

An electric motor chamber 255 is formed at a front portion of the casing 245 and an electric motor 265 for generating an assisting power is provided at the interior thereof. An outer case 257 of the electric motor 256 is fixed to the center case 246 by means several bolts 258 and a main shaft 259 thereof is provided in parallel to the crank shaft 33.

Then, a planetary speed reducing device 261 having a similar construction as that of the speed reducing device 60 of the first embodiment shown in FIGS. 2 and 3 is provided on the left side of the electric motor 256. The planetary speed reducing device 261 comprises a sun roller 262 supported by bearings 263, 264 and linked for rigid rotation with the main shaft 259 of the electric motor 256, an annular ring roller 265 fixed by means of bolt 266 to the center case 246, a reduction carrier 267 supported as rotatable about the sun roller 262 through a bearing 268 on the left side thereof, and four planet rollers rotatably supported on four roller shafts 269 fixed to the reduction carrier 267.

A primary drive gear 272 is provided on the left side surface of the reduction carrier 267 for rigid rotation therewith. When the main shaft 269 of the electric motor 256 is rotated, the sun roller 262 of the planetary speed reducing device 261 is also rotated as a rigid member thereof so that each planet roller 271 revolves about the sun roller 262 while rotating on its own axis between the fixed ring roller 265 and the rotating sun roller 262. The reduction carrier 267 and the primary drive gear 272 are thereby driven for rotation at a reduced speed. The main shaft 259 and the sun roller 262 are rotated in the direction indicated by arrow F2 and the reduction carrier 267 and the primary drive gear 272 are also rotated in the same direction.

On the other hand, an intermediate shaft 273 is rotatably supported by means of bearings 274, 275 between the sun roller 262 of the planetary speed reducing device 261 and the crank shaft 33. The intermediate shaft 273 is extended in parallel t o the crank shaft, 33 and a large-diameter primary driven gear 276 for meshing with the primary drive gear 272 is provided on a left end portion thereof for rigid rotation therewith. A small-diameter secondary drive gear 277 is provided on the right side of the primary driven gear 276.

The secondary drive gear 277 is provided around a gear sleeve 279 which is placed around the intermediate shaft 273 through a one-way clutch 278. While the one-way clutch 278 causes the gear sleeve 279 and the secondary drive gear 277 to rotate together with the intermediate shaft 273 when the intermediate shaft 273 and the primary driven gear 276 are rotated in the direction indicated by an arrow R in FIG. 10, it disconnects the clutch connection to cause racing of the secondary drive gear 277 about the intermediate shaft 273 for example when the rotating speed of the gear sleeve 279 and the secondary drive gear 277 exceeds the rotating speed of the intermediate shaft 273.

Further, a secondary driven gear 281 meshing with the secondary drive gear 277 is provided on the crank shaft 33 at a portion near the left end thereof. A boss 282 of the secondary driven gear 281 is rotatably supported on the crank shaft 33 through a metal bearing 283 and the bearings 251, 252 are provided on an outer circumference of the boss 282.

The four gears 272, 276, 277, 281 constitute a reduction gear train 284 so that, after a stage of speed reduction by the planetary speed reducing device 261, the assisting power generated by the electric motor 256 is subjected to two stages of speed reduction by the reduction gear train 284, i.e., to three stages of speed reduction altogether. It is then transmitted to a force composition device 287 to be described later.

A force composition device chamber 286 is formed at a rear portion of the casing 245 to accommodate the force composition device 287. FIG. 11 is an enlarged longitudinal sectional view of the force composition device 287. The force combining device 287 is provided coaxially with the crank shaft 33 and, for example, is constructed as follows.

First, a substantially cylindrical pedaling force transmitting member 288 is rotatably supported on the outer circumference of an intermediate portion of the crank shaft 33 through a pair of metal bearings 289, 290. A right end portion of the pedaling force transmitting member 288 is extended in diameter to form a clutch housing 291 and a one-way clutch 292 is provided at the interior thereof. The one-way clutch 292 is so constructed that it transmits only a rotation in the forward rotating direction F1 of the crank shaft 33 to the pedaling force transmitting member 288 while it disconnects the clutch connection, for example, when the crank shaft 33 is rotated backward or when the rotating speed of the pedaling force transmitting member 288 exceeds the rotating speed of the crank shaft 33.

Further, an annular assisting power transmitting member 293 is provided on the outer circumference of a left end portion of the pedaling force transmitting member 288 as rotatable but restricted of axial movement by a circlip 294. An annular joint plate 295 is fixed on a left side surface of the assisting power transmitting member 293 for rigid rotation therewith by means of screws 296. A serration 297 in the form of inner circumferential teeth is formed on the inner circumference of the joint plate 295. The serration 297 is meshed with a serration 299 in the form of outer circumferential teeth formed on the outer circumference of a right end portion of the boss 282 of the secondary driven gear 281. For this reason, the rotation of the secondary driven gear 281, i.e., the rotation obtained by reducing the speed of the assisting power of the electric motor 256 is transmitted as it is to the assisting power transmitting member 293.

On the other hand, an output rotating member 300 is provided next to the clutch housing 291 of the pedaling force transmitting member 288 on the right side thereof. The output rotating member 300 is rotatably supported on the crank shaft 33 using a bearing 301 and has an output housing 302 positioned on the right side thereof and an output sleeve 303 positioned on the left side thereof. It is assembled such that joining flanges 304, 305 formed on the joining portion of the two component parts 302, 303 are tightened to each other by several bolts 306.

A right end portion of the output housing 302 is projected outward from the right side of the casing 245, and the drive sprocket 36 is fixed to the projecting portion for rigid rotation therewith by coupling means 307 such as a spline or screws. Since the bearing 253 fixed on the casing 245 is sandwiched between the drive sprocket 36 and the output housing 302, it is impossible for the output rotating member 300 to move in the axial direction of the crank shaft 33.

Further, a holder ring 309 fixed to the interior of the output housing 302 for rigid rotation therewith by screw 308 holds a thrust flange 311 formed on a right end portion of the pedaling force transmitting member 288. The holder ring 309 is the component part for linking the pedaling force transmitting member 288 and the output rotating member 300 for rotation with respect to each other and at the same time for preventing a relative movement of the two members 288, 300 in the axial direction so that they are not separated in the axial direction of the crank shaft 33.

As shown in FIG. 10, a plurality of axially extended inner circumferential spline grooves 313 are formed on an inner circumferential surface of the output sleeve 303. Further, a stopper plate 314 made of a steel plate is sandwiched between the output housing 302 and the output sleeve 303, while the output sleeve 303 is covered by a stopper cover 315 made by pressing a steel plate. The stopper plate 314 and the stopper cover 315 are tightened together to the joining flanges 304, 305.

A force composition rotating member 316 is provided next to the output rotating member 300. The force composition rotating member 316 comprises a cylindrical force composition sleeve 317 positioned on the inner side of the output sleeve 303 of the output rotating member 300, and a force combining flange 318 fixed to a left end portion of the force composition sleeve 317. The force composition flange 318 is a plate in the form of a doughnut and has an inner diametrical portion into which the pedaling force transmitting member 288 is loosely inserted.

A plurality of axially extended outer circumferential spline grooves 319 are formed on an outer circumferential surface of the force composition sleeve 317. A ball spline 321 is constructed such that steel balls 320 are arranged between the inner circumferential spline grooves 313 of the output sleeve 303 and the outer circumferential spline grooves 319 of the force composition sleeve 317. The array of the steel balls 320 are retained at both ends thereof by claws 322, 323 formed on the stopper plate 314 and stopper cover 315 so that falling off of the steel balls 320 from the inner and outer circumferential spline grooves 313, 319 is prevented. This ball spline 321 allows the force composition rotating member 316 to be rigidly rotatable together with the output rotating member 300 and at the same time axially movable with respect thereto.

Figure 12:
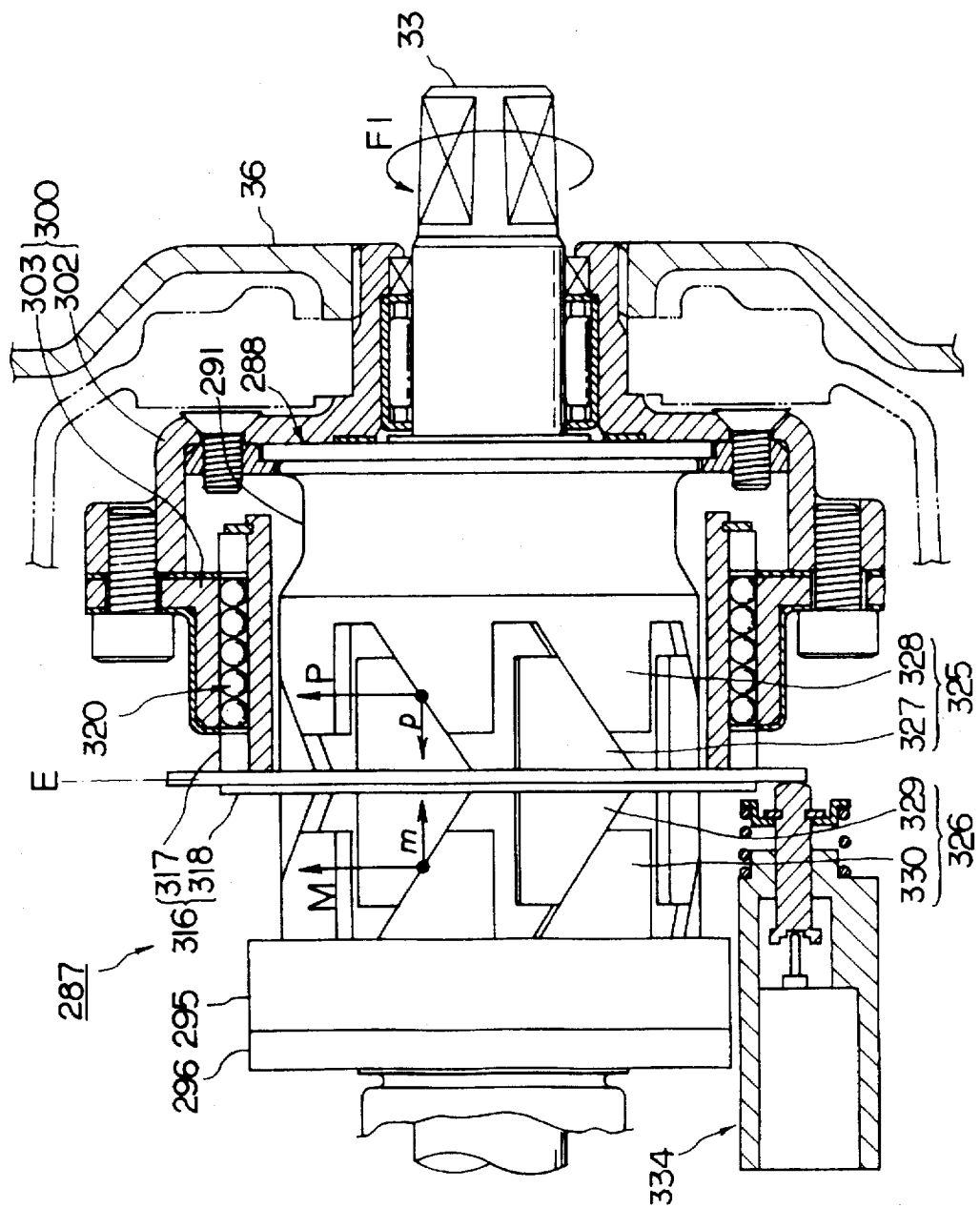
FIG. 12 is a partial sectional view showing the construction of a torque cam of the force composition device.

Furthermore, as shown in FIGS. 9, 11 and 12, a torque cam 325 is provided between the force composition flange 318 of the force composition rotating member 316 and the clutch housing 291 of the pedaling force transmitting member 288, and a torque cam 326 is provided between the force composition flange 318 and the assisting power transmitting member 293. The torque cam 325, 326 is provided on an inner circumferential side of the ball spline 321.

As shown in FIG. 12, the right side torque cam 325 comprises an inner cam 327 in the form of an inclined face cam formed on the right side surface of the force composition flange 318 and an outer cam 328 formed on the left side surface of the clutch housing 291 for meshing with the inner cam 327. Further, the left side torque cam 326 comprises an inner cam 329 in the form of an inclined face cam formed on the left side surface of the force composition flange 318 and an outer cam 330 formed on the right side surface of the assisting power transmitting member 293 for meshing with the inner cam 329.

The cam configurations of the torque cam 325 and torque cam 326 are symmetrical with respect to the force composition flange 318. The cam configuration of the torque cam 325 is such that, when the pedaling force transmitting member 288 is turned in the F1 direction upon receiving the rotation (pedaling force P) of the crank shaft 33, it transmits the pedaling force P to the force composition flange 318 of the force composition rotating member 316 and, at the same time, generates a thrust component force p having magnitude proportional to the pedaling force P as indicated by the vector. The force composition flange 318 is pressed toward the left by the thrust component force p.

On the other hand, the cam configuration of the torque cam 326 is such that, when the assisting power transmitting member 293 is turned in the F1 direction upon receiving the assisting power M of the electric motor 256, it transmits the assisting power M to the force composition flange 318 and, at the same time, generates a thrust component force m having magnitude proportional to the assisting power M so as to press the force composition flange 318 toward the right by the thrust component force m.

Furthermore, a pair of left and right coil springs 331, 332 are provided at the interior of the force composition device 287. These coil springs 331, 332 are provided on an inner circumferential side of the torque cams 325, 326, respectively. The right side coil spring 331 is charged into the space between the force composition flange 318 and the clutch housing 291 of the pedaling force transmitting member 288, and the left side coil spring 332 is charged into the space between the force composition flange 318 and the assisting power transmitting member 293.

Accordingly, the two coil springs 331, 332 are charged into the space between the clutch housing 291 of the pedaling force transmitting member 288 and the assisting power transmitting member 293 and, as a result, the force composition flange 318 which is an energizing portion of the force composition rotating member 316 is positioned between the two coil springs 331, 332. It should be noted that the shape and dimensions and spring constant of the left and right coil springs 331, 332 are identically set.

The pedaling force transmitting member 288 (clutch housing 291) and the assisting power transmitting member 293 are stationary in the axial direction of the crank shaft 33 while the force composition flange 318 is movable in the axial direction of the crank shaft 33. Thus, when the force composition flange 318 is pressed from both sides thereof by the two coil springs 331, 332 having even urging forces, the urging forces of the two coil springs 331, 332 are balanced and the force composition flange 318 is stopped at position E where the respective length of the coil spring 331, 332 equals to each other. Such position E becomes the neutral position of the force composition flange 318 and is determined to be the middle point in the range where the force composition rotating member 316 can move along the axial direction of the crank shaft 33.

The force composition device 287 is constructed as described above. As is apparent from FIGS. 9 to 11, the coil springs 331, 332 of the force composition device 287 are disposed on a circumference diametrically inner side than the torque cam 325, 326, and the ball spline 321 is disposed on a circumference diametrically outer side than the torque cam 325, 326 and the coil springs 331, 332.

A position sensor 334 is provided on an outer circumferential portion, toward the left side, for example, of the force composition flange 318. The position sensor 334 comprises a sensor holder 336 fixed to the casing 245 for example by screw 335, a sensor body 337 retained within the sensor holder 336, a measuring piece 338 retained as extendible/retractable from the sensor holder 336 toward the outer circumferential portion of the force composition flange 318, and a spring 339 for causing a terminal end of the measuring piece 338 to abut against the force composition flange 318. It is assembled into a state where a measuring needle 340 extended from the sensor body 337 is abutted against a rear portion of the measuring piece 338.

When the force composition flange 318 (force composition rotating member 316) is moved in the axial direction of the crank shaft 33, the measuring piece 338 of the position sensor 334 is correspondingly extended/retracted from/into the sensor holder 336. Such movement is read by the sensor body 337 so as to detect the displacement direction and displacement amount from the neutral position E of the force composition flange 318 (force composition rotating member 316).

Figure 13:
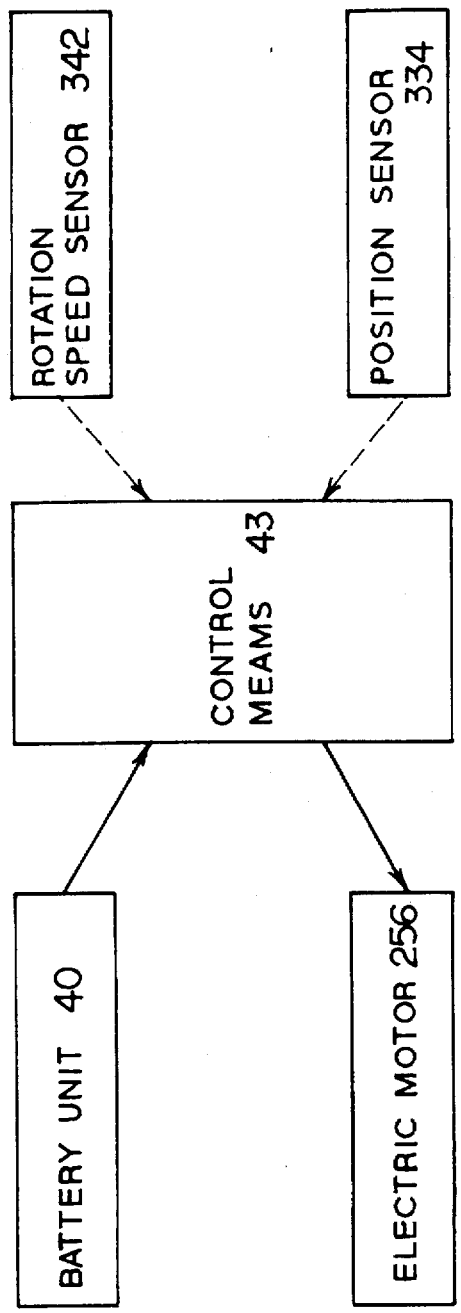
FIG. 13 is a block diagram showing the control system of the power assist apparatus as shown in FIG. 9.

As shown in FIG. 13, the position sensor 334 is electrically connected to the control means 43. The displacement direction and displacement amount of the force composition flange 318 (force composition rotating member 316) based on measurement by the position sensor 334 are input to the control means 43. The battery unit 40, the electric motor 256 and the rotating speed sensor 342 are electrically connected to the control means 43. The rotating speed sensor 342 is fixed to the interior of the casing 245 by means of bolt 343 for example at a portion near the planetary speed reducing device 261. When the reduction carrier 267 of the planetary speed reducing device 261 is rotated due to actuation of the electric motor 256, it detects the rotating speed of the electric motor 256 and inputs the resultant data to the control means 43 by reading movement of recesses 344 which are equidistantly formed on the outer circumferential surface of the reduction carrier 267.

Operation of the power assist apparatus constructed as described above is as follows.

When the crank shaft 33 is rotated in the F1 direction upon receiving a pedaling force in running of the power assisted bicycle 1, the rotation of the crank shaft 33 is transmitted to the pedaling force transmitting member 288 through the one-way clutch 292 of the force composition device 287 so that the pedaling force transmitting member 288 is driven for rotation in the F1 direction. On the other hand, the assisting power of the electric motor 256 is transmitted to the assisting power transmitting member 293 after being subjected to speed reduction by the planetary speed reducing device 261 and the reduction gear train 284 so that the assisting power transmitting member 293 is also driven for rotation in the same F1 direction. The rotating forces of the pedaling force transmitting member 288 and the assisting power transmitting member 293 are transmitted to the force composition flange 318 of the force composition rotating member 316 through the torque cam 325, 326, thereby the force composition rotating member 318 causes the output rotating member 300 to rotate in the F1 direction through the ball spline 321.

The rotating force of the output rotating member 300 is a composed force of the pedaling force and the assisting power. The composed force is outputted to the rear wheel 26 which is a driving wheel by means of the drive sprocket 36, the chain 38 and the driven sprocket 37. As a result, the pedaling force is assisted by the assisting power of the electric motor 256 where it is possible to easily run the power assisted bicycle 1 even with a relatively small pedaling force.

At the same time of transmitting the rotating forces of the pedaling force transmitting member 288 and the assisting power transmitting member 293 to the force composition rotating member 316, the torque cam 325, 326 causes two thrust component forces p, m having magnitude proportional to pedaling force P and assisting power M as shown in FIG. 12 to act on the force composition flange 318 of the force composition rotating member 316 from both the left and right sides thereof. The force composition flange 318 is thus pressed from the left and right sides by the thrust component forces p, m.

Figure 14A:
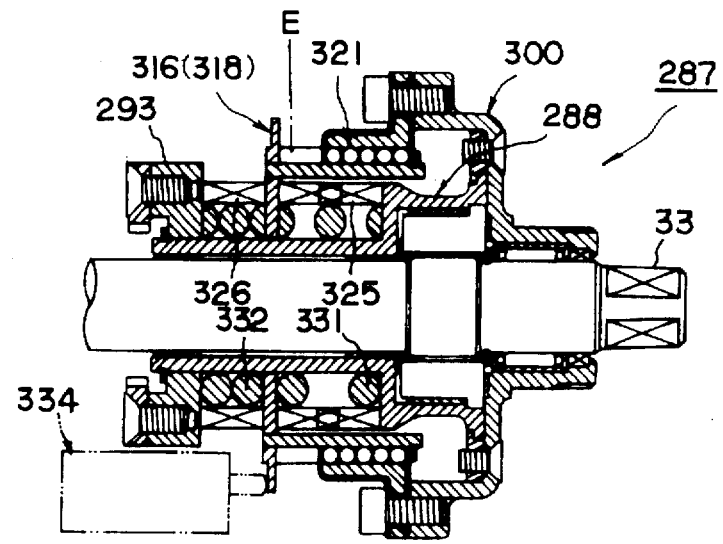
FIG. 14A is a longitudinal sectional view of the force composition device showing a case where the pedaling force is more intense than the assisting power.
Figure 14B:
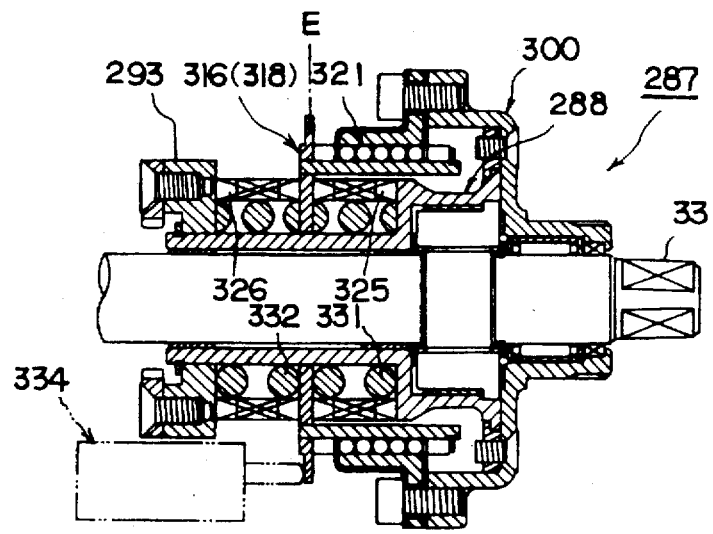
FIG. 14B is a longitudinal sectional view of the force composition device showing a case where the pedaling force and the assisting power are equal to each other.
Figure 14C:
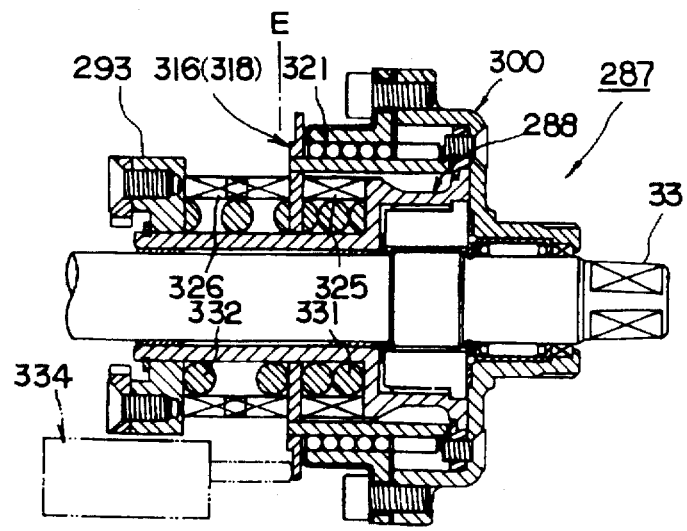
FIG. 14C is a longitudinal sectional view of the force composition device showing a case where the assisting power is more intense than the pedaling force.
Figure 15A:
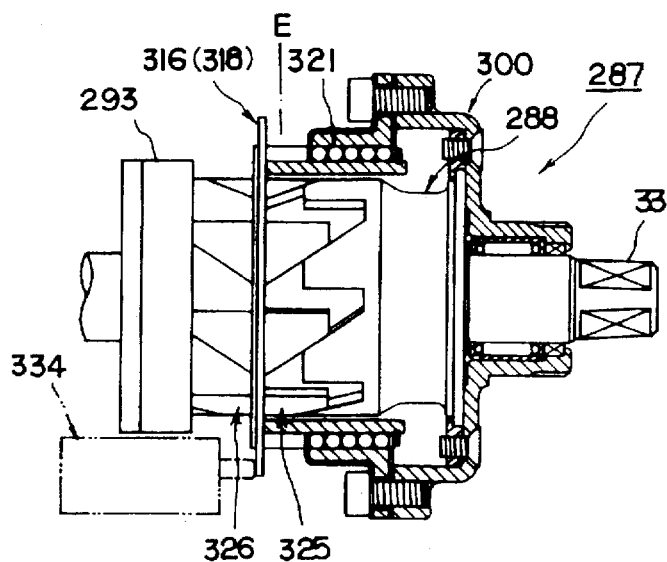
FIG. 15A is a partial sectional view of the force composition device showing a case where the pedaling force is more intense than the assisting power.
Figure 15B:
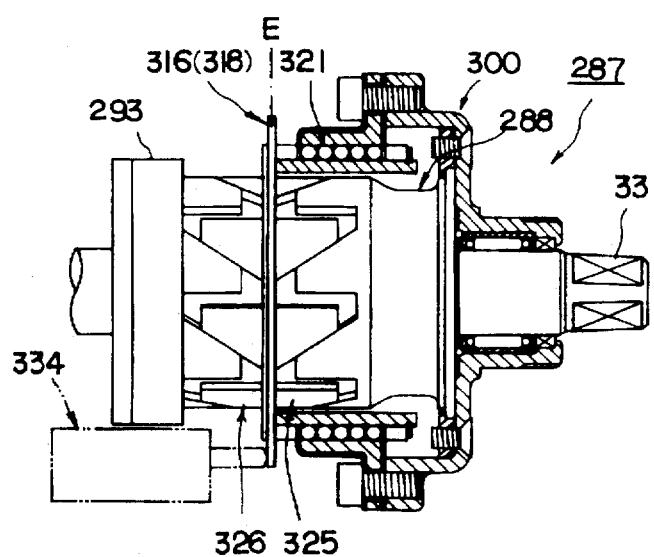
FIG. 15B is a partial sectional view of the force composition device showing a case where the pedaling force and assisting power are equal to each other.
Figure 15C:
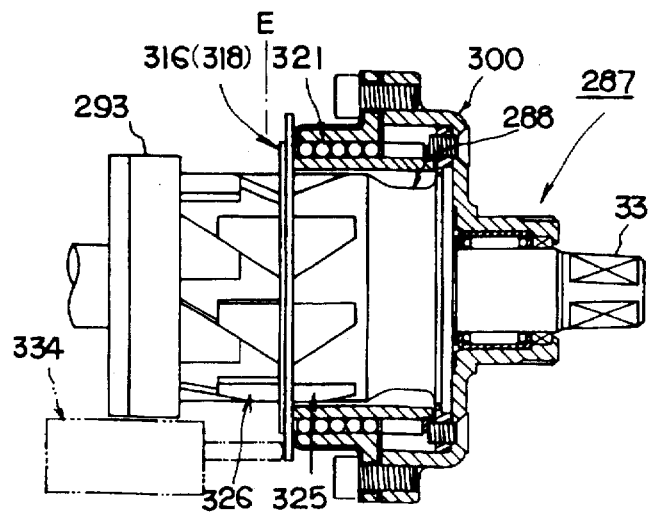
FIG. 15C is a partial sectional view of the force composition device showing a case where the assisting power is more intense than the pedaling force.

When the assist ratio is 1 to 1, i.e., when the magnitudes of the pedaling force P and the assisting power M are equal to each other, the magnitudes of the two thrust component forces p, m acting on the two sides of the force composition flange 318 are also equal to and are offset by each other so that the position of the force composition rotating member 316 is maintained at the neutral position E as shown in FIGS. 12, 14-B and 15-B.

If, however, the assist ratio has been changed from the 1-to-1 ratio, the magnitudes of the two thrust component forces p, m become uneven so that the force composition rotating member 316 is moved in the axial direction of the crank shaft 33 as it is pressed by the thrust component force p or m which has a higher magnitude. For example, if the pedaling force P is more intense than the assisting power M, the thrust component force p of the pedaling force P becomes more intense than the thrust component force m of the assisting power M so that the force composition rotating member 316 is pressed by the thrust component force p and is moved to the left from the neutral position E as shown in FIGS. 14-A and 15-A.

Further, if the assisting power M is more intense than the pedaling force P, the thrust component force m of the assisting power M becomes more intense than the thrust component force p of the pedaling force P, thereby the force composition rotating member 316 is pressed by the thrust component force m and is moved toward the right from the neutral position E as shown in FIGS. 14-C and 15-C.

Displacement direction and displacement amount from the neutral position E of the force composition rotating member 316 are then read by the position sensor 334, and the resultant data are input to the control means 43. The control means 43 detects the difference in magnitude between the two thrust component forces p, m based on the input from the position sensor 334 and controls the output of the electric motor 256 so as to bring such difference to "0". In other words, if the force composition rotating member 316 is moved toward the left from the neutral position E as shown in FIGS. 14-A and 15-A, the output of the electric motor 256 is increased. If, as shown in FIGS. 14-C and 15-C, the force composition rotating member 316 is moved to the right from the neutral position E, the output of the electric motor 256 is lowered. Thereby, the force composition device 287 is restored to its state shown in FIGS. 14-B and 15-B and the assist ratio is always maintained at the level of 1 to 1.

According to the power assist apparatus 203 constructed as described, since the assist ratio is directly and mechanically detected at a portion of the force composition device 287 where the pedaling force and the assisting power are composed similarly as the power assist apparatus 3 of the first embodiment as shown in FIGS. 2 and 3, the assist ratio may be determined accurately without an error. In addition, the assist ratio is set to 1 to 1 or to an optional ratio by the net output of the electric motor 256. Thus, the effects on the assist ratio for example due to dispersion in the output characteristic of the electric motor 256, charged state of the battery unit 40 or change in the friction loss of the force composition device 287 before and after a running-in will be completely ignored, whereby an accurate and easy control of the assist ratio is possible.

Further, in the power assist apparatus 203, since the coil springs 331, 332 of the force composition device 287 are disposed on a diametrically inner circumference than the torque cam 325, 326, an average coil diameter d1 of the coil springs 331, 332 is smaller. For this reason, a relatively high spring constant may be obtained even with a narrower wire diameter of the coil springs 331, 332, whereby it is possible to achieve compacting of the coil springs 331, 332, i.e., compacting of the force composition device 287.

Further, since the ball spline 321 of the force composition device 287 is disposed on a diametrically outer circumference than the torque cam 325, 326 and the coil springs 331, 332, a diameter d2 of the ball spline 321 is larger. The driving force from the force composition rotating member 316 and driving reaction force from the rear wheel 26 are continuously act upon the ball spline 321 as torques of opposite direction. The load due to these torques is smaller with an increase in the diameter d2 of the ball spline 321. Accordingly, the sliding of the ball spline 321 may be made smooth and, as a result, operation of the torque cam 325, 326 becomes smooth by increasing the diameter d2 of the ball spline 321 as described. Thus, the operability of the force combining device 287 becomes much better and durability thereof is also greatly improved.

Figure 16:
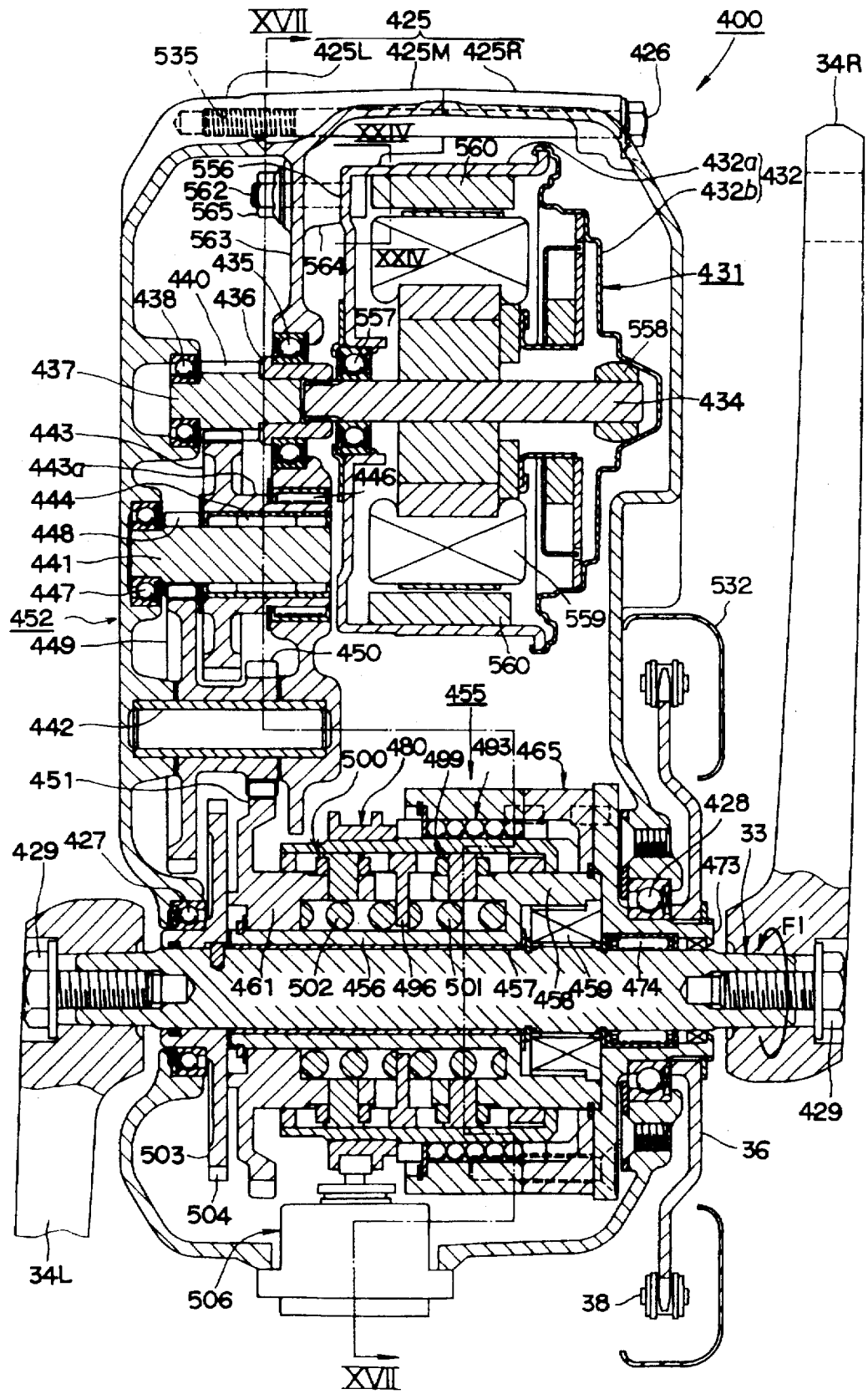
FIG. 16 is a cross sectional view of a power assist apparatus showing a third embodiment of the present invention.
Figure 17:
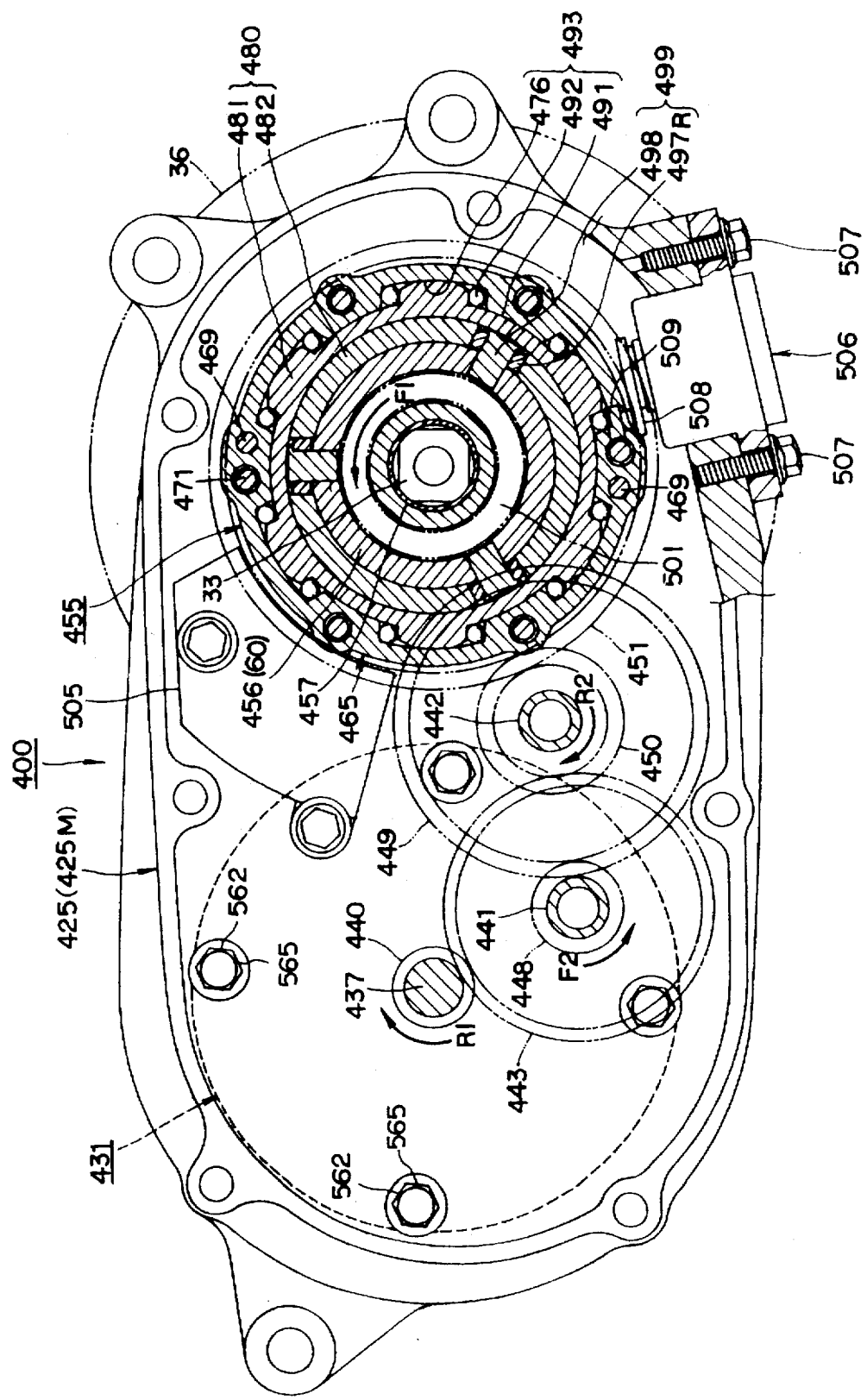
FIG. 17 is a longitudinal sectional view of the power assist apparatus taken along the line XVII—XVII of FIG. 16.

FIG. 16 shows a cross sectional view of a power assist apparatus 400 showing a third embodiment of the present invention and FIG. 17 is a longitudinal sectional view of the the assist apparatus 400 as viewed along the line XVII—XVII of FIG. 16.

A casing 425 forming an outer shell of the power assist apparatus 400 is made for example of an aluminum alloy and, as shown in FIG. 16, is constructed such that a left side case 425L, a center case 425M and a right side case 425R are fixed to each other by means of several case fixing bolts 426. FIG. 17 shows a state that the left side case 425L is removed.

The crank shaft 33 is rotatably supported on a rear portion of the casing 425 by bearings 427, 428, and cranks 34L and 34R are fixed by means of bolt 429 to the two end portions of the crank shaft 33 projecting toward the left and right sides from the casing 245.

An electric motor 431 for generating an assisting power is disposed at a front portion of the casing 425. An outer case 432 of the electric motor 431 is fixed to the center case 425M by several motor fixing bolts 562 and nuts 565 which will be described later.

A main shaft 434 of an electric motor 431 is parallel to the crank shaft 33, and a drive shaft 437 is linked to the left end of the main shaft 434 for rigid rotation therewith through a tubular joint member 436 which is supported by a bearing 435. The left end of the drive shaft 437 is supported by a bearing 438 provided on a side of the left side case 425L. A primary drive gear 440 is provided on the drive shaft 437 for rigid rotation therewith.

Further, a first intermediate shaft 441 and second intermediate shaft 442 are provided between the drive shaft 437 and the crank shaft 33. A primary driven gear 443 for meshing with the primary drive gear 440 is supported on the first intermediate shaft through a one-way clutch 444, a boss 443a of the primary driven gear 443 is extended to the right side to be supported by a bearing 446 provided on a side of the center case 425M. The left end of the first intermediate shaft 441 is supported by a bearing 447 provided on a side of the left side case 425L, and a secondary drive gear 448 is provided on the first intermediate shaft 441 for rigid rotation therewith between the bearing 447 and the primary driven gear 443.

A secondary driven gear 449 for meshing with the secondary drive gear 448 is rotatably supported on a second intermediate shaft 442, and a ternary drive gear 450 provided on the right side of the secondary driven gear 449 for rigid rotation therewith is meshed with a ternary driven gear 451 which is rotatably supported on the crank shaft 33.

As shown in FIG. 17, the drive shaft 437 and primary drive gear 440 are rotated in the direction indicated by an arrow R1. The primary driven gear 443 and secondary drive gear 448 are rotated in a rotating direction F2 and the secondary driven gear 449 and ternary drive gear 450 are rotated in a rotating direction R2, respectively. The ternary driven gear 451 is rotated in the same direction as the rotating direction F1 of the crank shaft 33.

The one-way clutch 444 provided on the primary driven gear 443 transmits only a rotation in the F2 direction of the primary driven gear 443 to the first intermediate shaft 441 and the secondary drive gear 448. When, for example, the rotating speed of the first intermediate shaft 441 and the secondary driven gear 448 exceeds the rotating speed of the primary driven gear 443, the connection of the one-way clutch 444 is disconnected to cause racing of the first intermediate shaft 441 and the secondary drive gear 448.

A reduction gear train 452 is constructed by the five gears 440, 443, 448, 449, 450 and the two intermediate shafts 441, 442. An assisting power generated by the electric motor 431 is transmitted to a force composition device 455 after being subjected to three stages of speed reduction through the reduction gear train 452.

Figure 18:
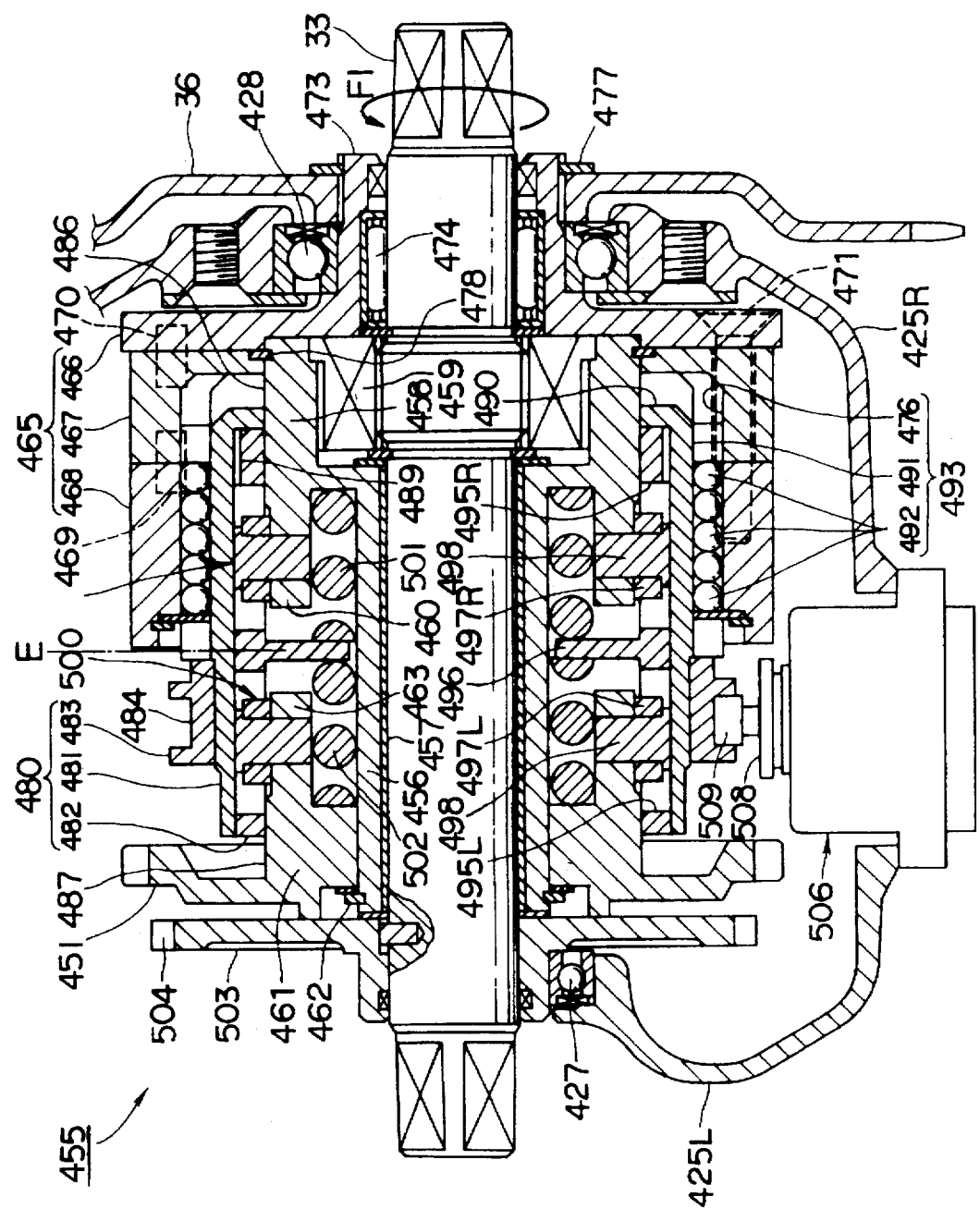
FIG. 18 is an enlarged cross sectional view of the force composition device.

The force composition device 455 is disposed at a rear portion of the casing 425. FIG. 18 is a cross sectional view magnifying the force combining device 455. The force composition device 455 is provided coaxially with the crank shaft 33 and, for example, constructed as follows.

First, a substantially cylindrical pedaling force transmitting member 456 is rotatably supported on the crank shaft 33 through a metal bearing 457. A right end portion of the pedaling force transmitting member 456 is enlarged in diameter to form a clutch housing 458 at the interior of which a one-way clutch 459 is provided. The one-way clutch 459 is constructed so as to transmit only the rotation in the forward F1 direction of the crank shaft 33 to the pedaling force transmitting member 456 and to disconnect the clutch connection for example when the crank shaft 33 is rotated backward or when the rotating speed of the pedaling force transmitting member 456 exceeds the rotating speed of the crank shaft 33. A cam roller holder 460 extended to the left side in shape of a circular cylinder is integrally formed on an outer circumferential portion of the clutch housing 458.

Further, an assisting power transmitting member 461 which is rotatable while restricted of movement toward the left side by the circlip 462 is provided on the circumference of a left end portion of the pedaling force transmitting member 456. A cam roller holder 463 extended to the right side in shape of a circular cylinder is integrally formed on the assisting power transmitting member 461, and the ternary driven gear 451 is rigidly provided on an outer circumference of the assisting power transmitting member 461. As a result, the rotation of the ternary driven gear 451, i.e., the rotation obtained by subjecting the assisting power of the electric motor 431 to speed reduction by the gears 440, 443, 448, 449, 450 is transmitted as it is to the assisting power transmitting member 461.

On the other hand, an output rotating member 465 is rotatably supported on the crank shaft 33 in the vicinity of the right end thereof. The output rotating member 465 comprises three component parts, that is, an output disc 466 in the form of a disc, and cylindrical output joint 467 and output slider 468 which are linked in that sequence to the left side of the output disc 466. The three component parts 466, 467, 468 are concentrically positioned by knock pins 469, 470 and are coupled to each other by means of screw 471.

An output boss 473 is formed on the right end of the output disc 466, a bearing 474 disposed within the output boss 473 rotatably supporting the output rotating member 465 as a whole about the crank shaft 33. The output boss 473 is caused to project to the outside from the casing 425 (right side case 425R) and the drive sprocket 36 is fixed thereto for rigid rotation therewith by means of such coupling means as a spline or screw. Further, a plurality of axially extending inner circumferential spline grooves 476 are formed on the inner circumference of the output joint 467 and output slider 468 as shown in FIG. 17.

The output rotating member 465 is prevented from moving in the axial direction by a circlip 477, and a circlip 478 provided around a right end portion of the pedaling force transmitting member 456 is sandwiched between the output disc 466 and the output joint 467 of the output rotating member 465. For this reason, the axial movement of the pedaling force transmitting member 456 is also prevented. The pedaling force transmitting member 456 and the output rotating member 465 are rotatable with respect to each other.

Then, a force composition rotating member 480 is provided on an inner circumferential side of the output disc 466 and an output joint 467 of the output rotating member 465. The force composition rotating member 480 comprises a force composition housing 481 substantially in the form of a cylinder, a cam sleeve 482 also formed in a substantially cylindrical shape and fixed to the inner side of the force composition housing 481, and an annular position sensor ring 483 fixed on the outer side of the force composition housing 481. An annular groove 484 is formed on the outer circumference of the position sensor ring 483.

A bearing surface 486 in the form of a circular cylindrical surface is formed on an outer circumference of the clutch housing 458 of the pedaling force transmitting member 456, and a circular cylindrical bearing surface 487 is also formed on an outer circumference of the assisting power transmitting member 461. The two bearing surfaces 486, 487 are positioned with a separation therebetween in the axial direction of the crank shaft 33, and the force composition rotating member 480 is supported so as to extend between the bearing surfaces 486, 487.

Figure 19:
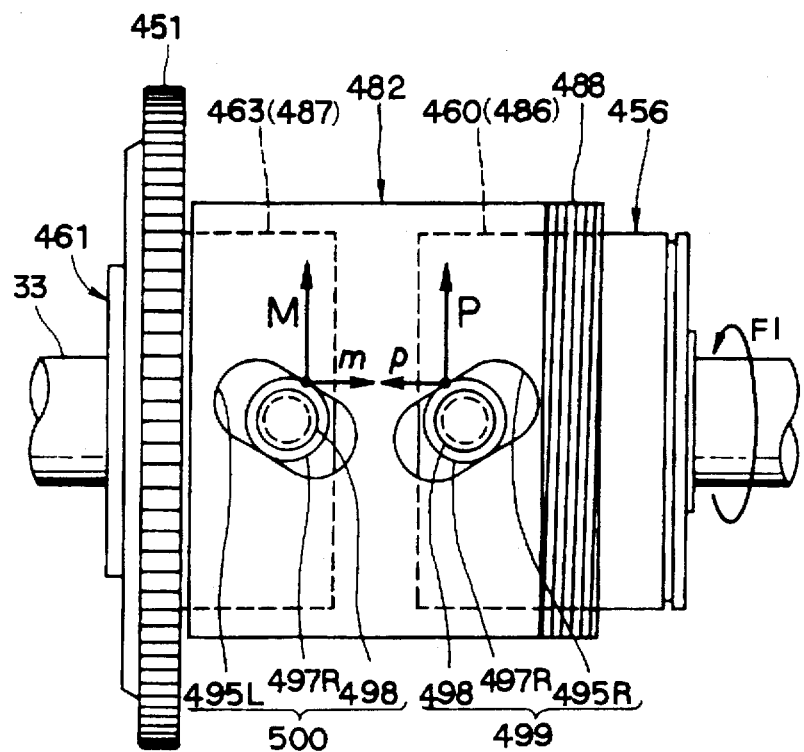
FIG. 19 shows a cam sleeve alone with a force composition housing taken away from the force composition rotating member.

FIG. 19 shows only the cam sleeve 482 by removing the force composition housing 481 from the force composition rotating member 480. As shown in this figure, a male screw 488 is formed on the right end of the cam sleeve 482, and the two component parts 481, 482 are fixed into an integrated rigid member when the male screw 488 is tightened into a female screw 489 as shown in FIG. 18 formed on the right end of an inner circumferential portion of the force composition housing 481. The cam sleeve 482 is tightly screwed in until it abuts at the right end thereof against an inner flange 490 which is formed on the right end of the force composition housing 481. The male screw 488 and the female screw 489 are disposed so that they are positioned on an outer circumference of the bearing surface 486 of the pedaling force transmitting member 456. Further, the threaded portions 488, 489 are formed as left-handed screws. On the other hand, the position sensor ring 483 is fixed on an outer side of the force composition housing 481 using such fixing means as press fitting or caulking.

The force composition housing 481 is to serve as the ball spline constituting portion, and an outer circumference thereof is formed with a plurality of axially extended outer circumferential spline grooves 491 as shown in FIG. 17.

Steel balls 492 are arranged between the outer circumferential spline groove 491 and the inner circumferential spline groove 476 of the output rotating member 465 to constitute a ball spline 493. Through the ball spline 493, the force composition rotating member 480 is rigidly rotatable with the output rotating member 465 and at the same time being movable in the axial direction with respect thereto.

Further, the cam sleeve 482 of the force composition rotating member 480 serves as the cam constituting portion. As shown in FIG. 19, a pair of left and right cam grooves 495R, 495L extended in V-shape in a spiral direction are formed on the cam sleeve 482. Three sets of cam grooves 495R, 495L, for example, are formed at an angular separation of 120° in the circumferential direction of the cam sleeve 482. The cam groove 495R is formed to be inclined in a left-handed screw direction and the cam groove 495L inclined in a right-handed screw direction. As shown in FIGS. 16 and 18, an inwardly erected center flange 496 is formed between the cam grooves 495R, 495L, and the inner diameter of the center flange 496 is made slightly larger than the outer diameter of an intermediate portion of the pedaling force transmitting member 456.

On the other hand, the cam rollers 497R, 497L are provided on the outer circumferential surfaces of the cam roller holder 460 formed on the pedaling force transmitting member 456 and of the cam roller holder 463 formed on the assisting power transmitting member 461, respectively, at an angular separation of 120° in the circumferential direction. These cam rollers 497R, 497L are rotatably supported on roller pins 498. The rotating axis (axis of roller pin 498) of each cam roller 497R, 497L is orthogonal to the crank shaft 33.

Then, the cam roller 497R on the side of the pedaling force transmitting member 456 is engaged with the interior of the cam groove 495R of the cam sleeve 482 to constitute a torque cam 499, and the cam roller 497L on the side of the assisting power transmitting member 461 is engaged with the interior of the cam groove 495L of the cam sleeve 482 to form a torque cam 500. The diameter of the cam roller 497R, 497L is set to such a size that the cam rollers 497R, 497L are movable for rolling within the cam grooves 495R, 495L and, at the same time, do not oscillate in the width direction of the cam grooves 495R, 495L.

When the pedaling force transmitting member 456 is turned in the F1 direction upon receiving a rotation (pedaling force) of the crank shaft 33, the torque cam 499 transmits the pedaling force P to the force composition rotating member 480 (cam sleeve 482) and, at the same time, generates a thrust component force p having magnitude proportional to pedaling force P as indicated by the vector in FIG. 19. Due to the thrust component force p, the cam sleeve 482 is pressed toward one side, for example, to the Further, when the assisting power transmitting member 461 is turned in the F1 direction upon receiving the assisting power of the electric motor 431, the torque cam 500 transmits the assisting power M to the cam sleeve 482 and, at the same time, generates a thrust component force m having magnitude proportional to the assisting power M so as to press the cam sleeve 482 toward the other side, for example, to the right by the thrust component force m.

Furthermore, a pair of left and right coil springs 501, 502 are provided on the inner circumferential side of the torque cam 499 and torque cam 500. The right side coil spring 501 is charged into the space between the center flange 496 of the cam sleeve 482 and the clutch housing 458 of the pedaling force transmitting member 456, and the left side coil spring 502 is charged into the space between the center flange 496 and the assisting power transmitting member 461. The shape and size and the spring constant of the left and right coil springs 501, 502 are set identically.

The clutch housing 458 of the pedaling force transmitting member 456 and the assisting power transmitting member 461 are stationary in the axial direction of the crank shaft 33, and the center flange 496 therebetween is movable in the axial direction of the crank shaft 33. As a result, when the center flange 496 is pressed from both the left and right sides thereof by the two coil springs 501, 502 having even urging forces, the urging forces are balanced and the center flange 496 is stopped at a position E where the respective lengths of the two coil springs 501, 502 are equal to each other. The position E becomes a neutral position of the force composition rotating member 480 (center flange 496) and the position E is determined such that it takes the middle point in the range where the force composition rotating member 480 is movable in the axial direction of the crank shaft 33.

The force composition device 455 is constructed as described above. A disc-like sensor plate 503 is provided for rigid rotation with the crank shaft 33 next to the force composition device 455 on the left side thereof. Recesses and projections 504 are formed in the manner of a toothed wheel on the outer circumference of the sensor plate 503. On the other hand, as shown in FIG. 17, a rotating speed sensor 505 is provided on the casing 425 (425M), and the rotating speed sensor 505 reads the movement of the recesses and projections 504 on the outer circumference of the sensor plate 503 to detect the rotating speed of the crank shaft 33.

Figure 20:
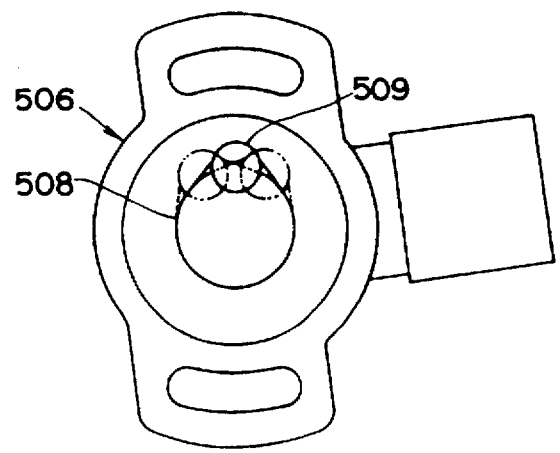
FIG. 20 is a plan view showing a position sensor.

As shown in FIG. 20, a position sensor 506 is provided on a lower portion of the force composition device 455. The position sensor 506 serves as the movement detection means. The position sensor 506 is fixed to a lower surface of the casing 425 by means of bolt 507, and a miniature bearing 509 supported at a terminal end of a turning arm 508 provided on an upper surface thereof is fitted into the sensor groove 484 of the position sensor ring 483 so as to be slidable therein.

When the force composition rotating member 480 is moved in the axial direction of the crank shaft 33, the position sensor ring 483 is also axially moved together with the force composition rotating member 480. Thus, the turning arm 508 of the position sensor 506 is turned to detect the displacement direction and displacement amount of the force composition rotating member 480 from the neutral position E.

As shown in FIG. 21, the position sensor 506 is electrically connected to the control means 43. The displacement direction and the displacement amount of the force combining rotating member 480 based on the measurement by the position sensor 506 are inputted to the control means 43. The control means 43 is electrically connected to such equipments as the battery unit 20, the electric motor 431 and the rotating speed sensor 505.

Operation of the assist apparatus 400 constructed as described above is as follows.

When the crank shaft 33 is rotated in the F1 direction upon receiving the pedaling force during running of the power assisted bicycle 1, such rotation of the crank shaft 33 is transmitted to the pedaling force transmitting member 456 through the one-way clutch 459 of the force composition device 455, and the pedaling force transmitting member 456 is driven for rotation in the F1 direction. On the other hand, the assisting power of the electric motor 431 is subjected to three stages of speed reduction by the six gears 440, 443, 448, 449, 450, 451 and is transmitted to the assisting power transmitting member 461 so that the assisting power transmitting member 461 is also driven for rotation in the same F1 direction.

The rotating forces of the pedaling force transmitting member 456 and assisting power transmitting member 461 are transmitted through the torque cam 499 and torque cam 500, respectively, to the force composition rotating member 480. The force composition rotating member 480 causes the output rotating member 465 to rotate in the F1 direction through the ball spline 493. The rotating force of the output rotating member 465 is a composed force of the pedaling force and assisting power, and the composed force is outputted to the rear wheel 26 which is a driving wheel through the drive sprocket 36, the chain 38 and the driven sprocket 37. For this reason, the pedaling force is assisted by the assisting power of the electric motor 431. The torque cam 499 and torque cam 500 transmit the rotating forces of the pedaling force transmitting member 456 and assisting power transmitting member 461 to the force composition rotating member 480 and, at the same time, cause two thrust component forces p, m having magnitude proportional to pedaling force P and assisting power M as shown in FIG. 19 to act upon the force composition rotating member 480 (cam sleeve 482) from both the left and right sides thereof. The force composition rotating member 480 is thus pressed from the left and right sides by the thrust component forces p, m.

Figure 22A:
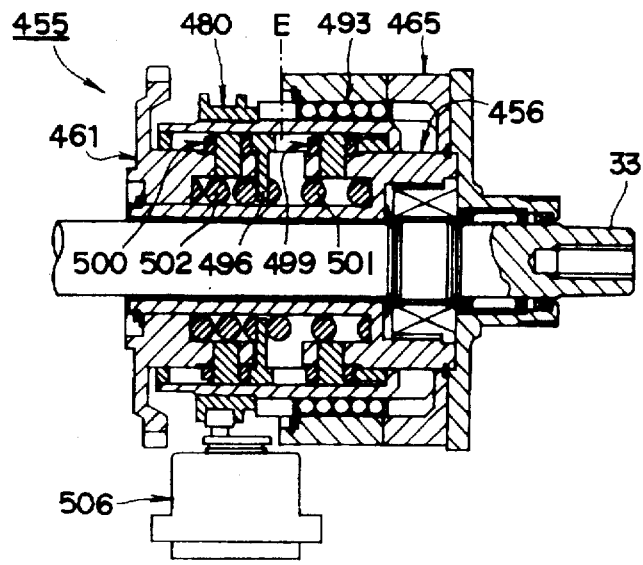
FIG. 22A is a longitudinal sectional view of the force composition device showing the case where the pedaling force is more intense than the assisting power.
Figure 22B:
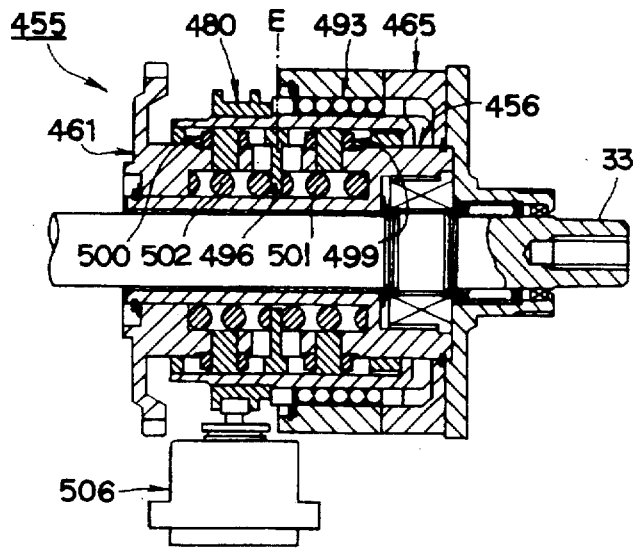
FIG. 22B is a longitudinal sectional view of the force composition device showing the case where the pedaling force and the assisting power are equal to each other.
Figure 22C:
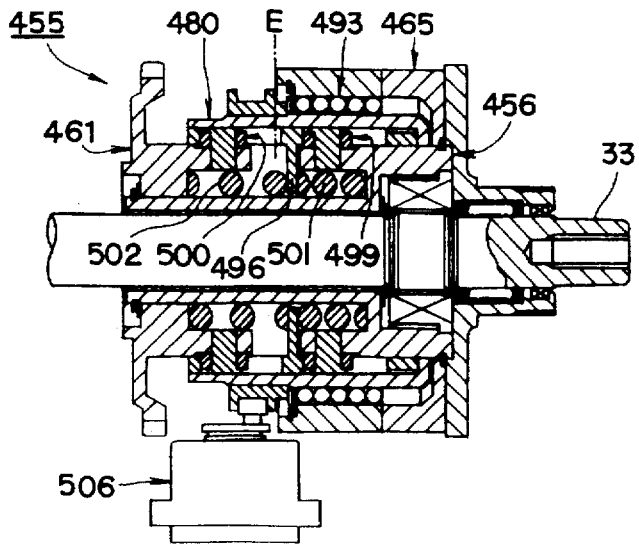
FIG. 22C is a longitudinal sectional view of the force composition device showing a case where the assisting power is more intense than the pedaling force.

When the assist ratio is 1 to 1, i.e., when the magnitudes of the pedaling force P and the assisting power M are even, the magnitudes of the two thrust component forces p, m acting on the force composition rotating member 480 from the two sides thereof also become even and are offset by each other so that the position of the force composition rotating member 480 (center flange 496) is maintained at the neutral position E as shown in FIGS. 18 and 22-B.

When the assist ratio has changed from the 1-to-1 ratio, the magnitudes of the two thrust component forces become uneven. The force composition rotating member 480 is moved in the axial direction of the crank shaft 33 as it is pressed by the thrust component force p or m which is higher in magnitude. For example, if the pedaling force P is more intense than the assisting power M, the thrust component force p of the pedaling force P becomes more intense than the thrust component force m of the assisting power M so that the force composition rotating member 480 (center flange 496) is pressed by the thrust component force p and moved to the left from the neutral position E as shown in FIG. 22-A.

Further, if the assisting power M is more intense than the pedaling force P, the thrust component force m of the assisting power M becomes more intense than the thrust component force p of the pedaling force P so that the force composition rotating member 480 (center flange 496) is pressed by the thrust component force m to be moved to the right from the neutral position E as shown in FIG. 22-C.

Displacement direction and displacement amount from the neutral position E of the force composition rotating member 480 (center flange 496) is then read by the position sensor 506 and the resultant data are input to the control means 43. The control means 43 detects the difference in magnitude of the two thrust component forces p, m based on the input from the position sensor 506 and controls the output of the electric motor 431 so as to bring such difference to "0". In other words, it causes the output of the electric motor 431 to be increased when the force composition rotating member 480 has been moved to the left from the neutral position E as shown in FIG. 22-A and causes the output of the electric motor 431 to be lowered when the force composition rotating member 480 has been moved to the right from the neutral position E as shown in FIG. 22-C. Therefore, the force composition device 455 is maintained in its state shown in FIG. 22-B and the assist ratio is always maintained at 1 to 1.

It is to be noted that, by setting an optional value to the control means 43 as the difference in magnitude between the two thrust component forces p, m, the assist ratio may be set not only to the 1-to-1 ratio but also to an optional ratio. For example, when the difference in magnitude between the two thrust component forces p and m is set to 1 to 0.5, the assisting power M becomes one half of the pedaling force P.

The control means 43 determines the bicycle speed from the rotating speed of the crank shaft 33 inputted from the rotating speed sensor 505 and, for example, when the bicycle speed has exceeded a certain level, it causes power supply amount to the electric motor 431 to be reduced or brought to "0" so as to avoid an excessive bicycle speed.

With the power assist apparatus 400, it is also possible to ride the bicycle only by the pedaling force without actuating the electric motor 431. In this case, the force composition device 455 as a whole is rotated in the F1 direction together with the drive sprocket 36 upon receiving the pedaling force, and the rotation of the drive sprocket 36 is transmitted to the rear wheel 26. At this time, while the ternary driven gear 451 is also rotated in the F1 direction together with the force composition device 455 so that the ternary drive gear 450, secondary driven gear 449, the secondary drive gear 448 and the first intermediate shaft 441 are driven backward, the primary driven gear 443 and first drive gear 440 are not rotated due to the fact that the connection at the one-way clutch 444 is disconnected. A backward drive of the electric motor 431 is thereby prevented where the light pedaling force is maintained.

With the power assist apparatus 400 constructed as described above, the assist ratio is directly and mechanically detected at the portion of the force composition device 455 where the pedaling force and assisting power are composed in a manner similar to that of the power assist apparatus 3 of the first embodiment or to that of the power assist apparatus 203 of the second embodiment. It is thus possible to accurately determine the assist ratio without an error and, in addition, the assist ratio is set to the 1-to-1 ratio or to an optional ratio based on the net output of the electric motor 431 so that the assist ratio may be controlled accurately and easily.

Furthermore, since, in the power assist apparatus 400, the torque cam 499 and torque cam 500 of the force combining device 455 are constructed as a roller type, the resistance thereof at the time of operation is very small and the movement thereof is made smooth. Therefore, even for a slight change in ratio of the component force p of pedaling force P to the component force m of assisting power M, the force composition rotating member 480 is able to sensitively detect and follow such very small change in the ratio. Accordingly, the assist ratio may be controlled more accurately. Since grease may be sealed in the cam grooves 495R, 495L, the two torque cams 495, 500 are greatly improved in lubricating ability and durability thereof is also upgraded.

In addition, since the force composition rotating member 480 of the force composition device 455 is supported in a manner extended between the bearing surface 486 of the pedaling force transmitting member 456 and the bearing surface 487 of the assisting power transmitting member 461 which are separated in the axial direction of the crank shaft 33, the oscillation of axis of the force composition rotating member 480 as a whole with respect to the crank shaft 33 becomes minimum so that the oscillation of the position sensor ring 483 also becomes very small. Therefore, the position detection of the force composition rotating member 480 becomes accurate and it is possible to accurately grasp the magnitude of the pedaling force and the assisting power applied to the force composition device 455.

Since the force composition rotating member 480 is constructed so that the force composition housing 481 serving as the ball spline constituting portion thereof and the cam sleeve 482 serving as the cam constituting portion are formed as separate members, the respective materials of the force composition housing 481 and the cam sleeve 482 may be different from each other so that durability of the force composition device 455 is greatly improved by selecting a suitable material for each. Further, since the two component parts 481, 482 are assembled by tightening screws and is easily disassembled, the material of each component part is made different from that of another part without degrading the capability of the force composition device 455 (force composition rotating member 480) in disassembling and assembling thereof.

Since the female thread 489 of the force composition housing 481 and the male thread 488 of the cam sleeve 482 are formed as left-handed screws, the cam sleeve 482 is gradually tightened into the force composition housing 481 when it is driven for rotation in the F1 direction. Thus, the coupling of the force composition housing 481 and the cam sleeve 482 will not be loosened during operation.

The screw tightening portion of the force composition housing 481 and the cam sleeve 482 is disposed on an outer circumference of the bearing surface 486 of the pedaling force transmitting member 456. Therefore, a dead space on the outer circumference of the clutch housing 458 of the pedaling force transmitting member 456 may be effectively used so as to prevent an increase in the size of the force composition device 455.

Figure 23:
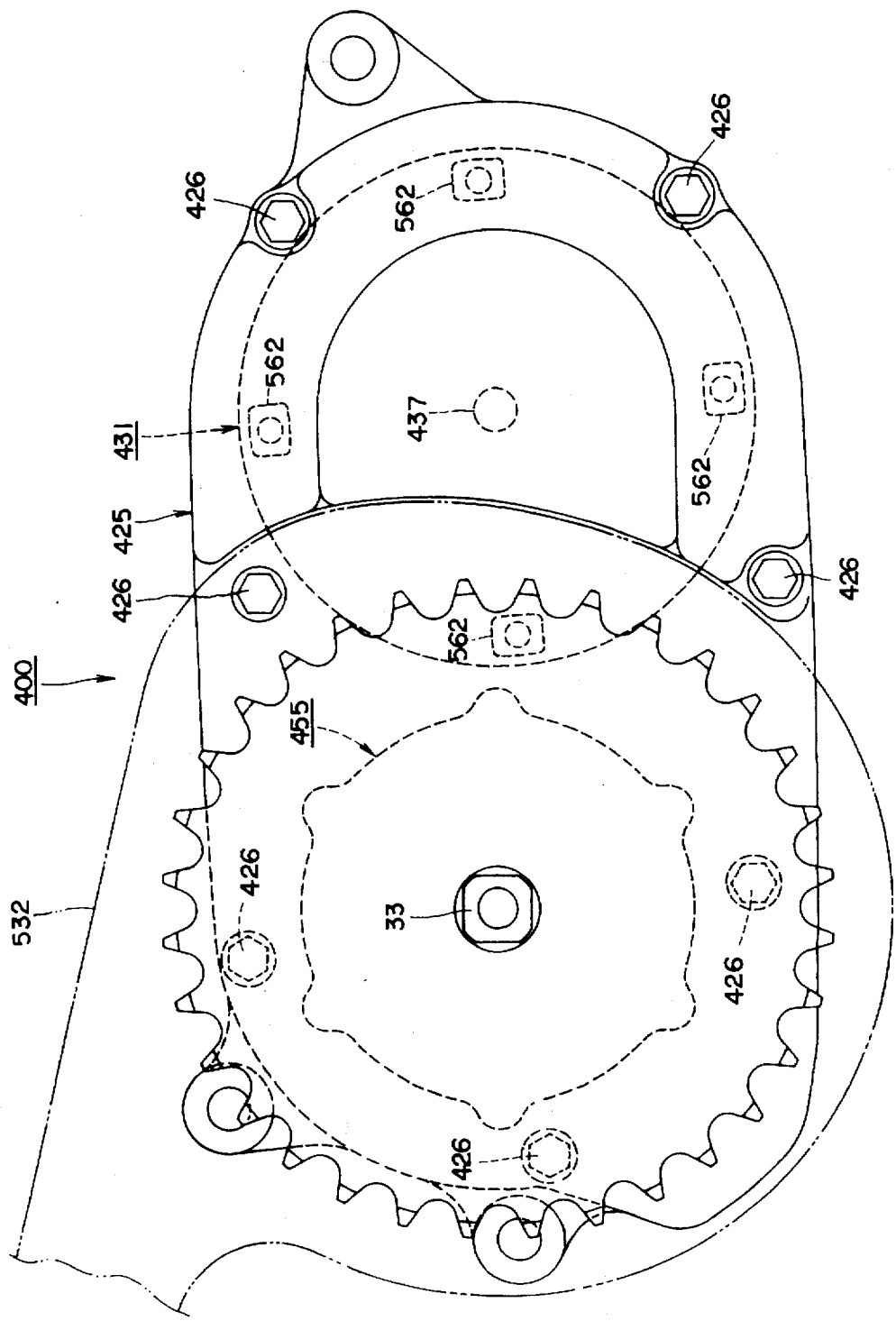
FIG. 23 is right side view of the power assist apparatus shown in FIG. 16.

The casing 425 of the power assist apparatus 400 is constructed as described above such that the center case 425M and right side cases 425L, 425R are fixed to each other by means of case fixing bolt 426. As shown in FIG. 23, seven fixing case bolts 426, for example, are sued. These case fixing bolts 426 are inserted from the side case toward the drive sprocket 36, i.e., from the side of the side case 425R and penetrate through the center case 425M to be tightened into female threads 535 which are formed on the inner side of the side case 425L.

For this reason, the number of female threads to be formed on the casing 425 is reduced to half comparing to a conventional construction where, for example, the left and right side cases 425L, 425R are fixed to the center case 425M by their respective exclusive fixing bolts. The processing cost of the casing 425 can thus be greatly reduced.

Further, assembly of the casing 425 requires only to place the left side case 425L on the lower side upon which the center case 425M and the right side case 425R are placed in an overlap and to tighten the case fixing bolts 426 into the female screws 535 of the side case 425L by inserting them from the right side case 425R. Unlike the conventional example, it is not necessary to attach the left and right side cases by turning the center case upside down. For this reason, the assemblability of the casing 425 can be greatly improved.

Furthermore, since the case fixing bolts 426 are inserted and tightened into the casing 425 from the side toward the drive sprocket 36, the heads of half the number of the case fixing bolts 426 are covered by the drive sprocket 36 and the chain cover 532. For this reason, exposure of the heads of the case fixing bolts 426 is prevented to the greatest extent possible, and the aesthetic appearance of the casing 425 is improved also in this regard. In addition, the head of the case fixing bolt 426 is less likely to interfere with a leg or clothes of the rider.

Although some of the case fixing bolts 426 are exposed to the outside, all of such case fixing bolts 426 are to be exposed toward the side of the drive sprocket 36 and this side (right side) is opposite to the side (left side) where the rider gets up on and off the bicycle. Thus, such case fixing bolts 426 are not conspicuous and do not lead to a significant degrading of the appearance.

The outer case 432 of the electric motor 431 is constructed such that a case cap 432b is fitted into a case body 432a. The main shaft 434 is then supported by a bearing 557 provided at a center portion of an attaching seat surface 556 of the case body 432a and a bearing 558 provided on the case cap 432b. A coil 559 is provided at an intermediate portion of the main shaft 434 for rigid rotation therewith, and a plurality of magnets 560 are secured to an inner circumferential portion of the case body 432a.

Four motor fixing bolts 562, for example, are inserted from the inner side of the electric motor 431 into the attaching seat surface 556 of the outer case 432 (case body 432a). These motor fixing bolts 562 are restricted of the axial movement and rotation with respect to the outer case 432.

On the other hand, an electric motor fixing wall portion 563 is formed at the interior of the casing 425 (for example the center case 425M), and four attaching bases 564 are integrally formed on the right side surface of the electric motor fixing wall portion 563 corresponding to the position of the motor fixing bolts 562.

Each motor fixing bolt 562 then penetrates through the electric motor fixing wall portion 563 upon insertion into the attaching base 564. The nut 565 is tightened to the motor fixing bolt 562 from the opposite side of the electric motor fixing wall portion 563. Therefore, the electric motor 431 can be firmly fixed to the electric motor fixing wall portion 563.

Figure 24:
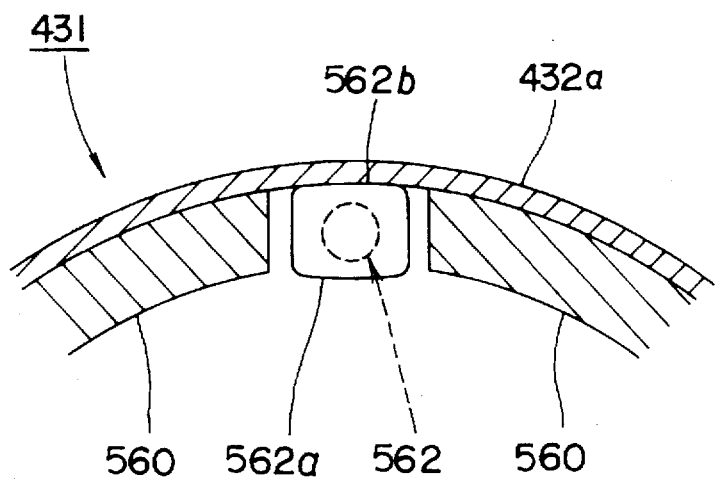
FIG. 24 is a longitudinal sectional view taken along the line XXIV—XXIV of FIG. 16.

Each motor fixing bolt 562 is disposed on an outermost circumferential portion of the attaching seat surface 556 and, at the same time, is disposed between the plurality of magnets 560 provided on an inner circumferential portion of the case body 432a as shown in FIG. 24. A head portion 562a of the motor fixing bolt 562 is formed for example into a rectangular shape and one side surface 562b thereof is brought close to (abuts against) the inner circumferential surface of the outer circumferential wall of the case body 432a so as to restrict a rotation of the motor fixing bolt 562 with respect to the outer case 432.

In the case where the electric motor 431 is fixed to the interior of the casing 425 in this manner, since the attaching seat surface 556 of the electric motor 431 is in close proximity to the attaching base 564 of the electric motor fixing wall portion 563, the attaching precision of the electric motor 431 is improved and an inclination of the main shaft 434 is prevented. For this reason, it is possible to prevent such disadvantages as uneven wear, an occurrence of unusual sound, an increase in mechanical loss at the joint portion (joint member 436) between the main shaft 434 and the drive shaft 437.

Further, since the motor fixing bolt 562 receives the torque due to the drive reaction force of the electric motor 431 as a shearing load instead of a bending load, there is a great advantage in strength. For this reason, the diameter of the motor fixing bolt 562 can be made smaller and this fact together with the fact that the motor fixing bolt 562 is very short makes it possible to achieve compacting of the motor fixing bolt 562.

Furthermore, a component part such as an attaching bracket does not project from the outer circumferential portion of the electric motor 431, and neither does such component part project from the contour of the casing 425. It is thus possible to achieve a reduction in size and an improvement in aesthetic appearance of the casing 425.

In addition, the motor fixing bolt 562 is fixed to the outer case 432 and the motor fixing bolt 562 is not to be inserted into or removed from the interior of the outer case 432 when attaching or removing the electric motor 431. Thus, there is no concern over such troubles as one caused by falling off into the outer case 432 of foreign matters as a metal powder which has been adhered to the motor fixing bolt 562.

Further, since the motor fixing bolt 562 is disposed between the plurality of magnets 560 provided on the inner circumferential portion of the outer case 432, it is possible to bring the head portion of the motor fixing bolt 562 and the magnet 560 into an overlap as viewed in a plan of FIG. 16). For this reason, the motor fixing bolt 562 can be provided without increasing the width of the outer case 432 (depth of the case body 432a) or without sacrificing the width of the magnets 560 so that it is possible to prevent an increase in the size of the outer case 432 and a lowering of performance of the electric motor 431. Furthermore, the one side surface 562b of the head 562a of the motor fixing bolt 562 is brought close to (abuts against) the inner circumferential surface of the outer circumferential wall of the case body 432a to restrict a rotation of the motor fixing bolt 562 with respect to the outer case 432. It is thereby possible to restrict the rotation of the motor fixing bolt 562 without relying on such joining means as welding.

Accordingly, an increase in the number of steps for processing the outer case 432 may be prevented and, at the same time, warpage of the outer case 432 due to heat of welding can be avoided. In addition, since it is possible to place the motor fixing bolt 562 after bonding the magnet 560 to the case body 432a, the degree of freedom in the production process of the electric motor 431 is increased. The restriction of axial movement of the motor fixing bolt 562 can be readily performed for example by caulking the motor fixing bolt 562 with respect to the outer case 432.

Figure 25:
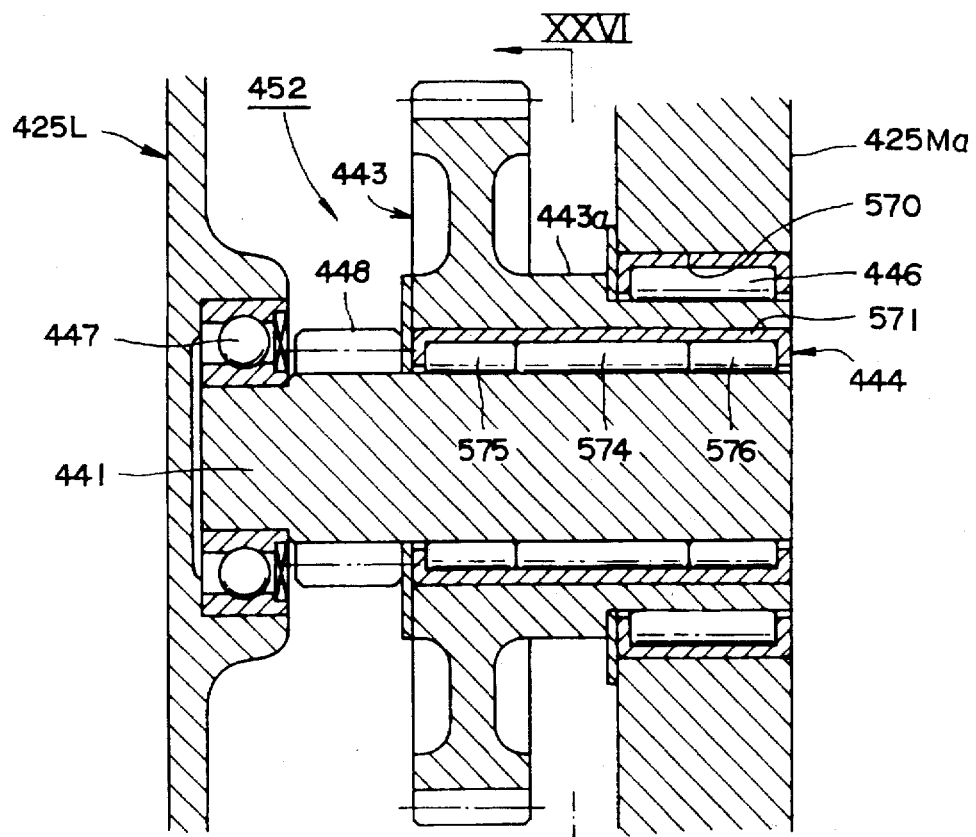
FIG. 25 is an enlarged view of a backward rotation preventing device shown in FIG. 16.

On the other hand, as shown in FIG. 25, the boss portion 443a of the primary driven gear 443 supported on the first intermediate shaft 441 is extended toward the bearing 446 for supporting one end (for example right end) of the first intermediate shaft 441, and the right end of the boss portion 443a and the right end of the first intermediate shaft 441 are uniform in length. The bearing 446 is for example a needle bearing and the bearing 446 is provided on the outer circumference of the boss portion 443a. The outer circumference of the bearing 446 is press-fitted into a bearing hole 570 provided on an inner wall 425Ma of the center case 425M.

Figure 26:
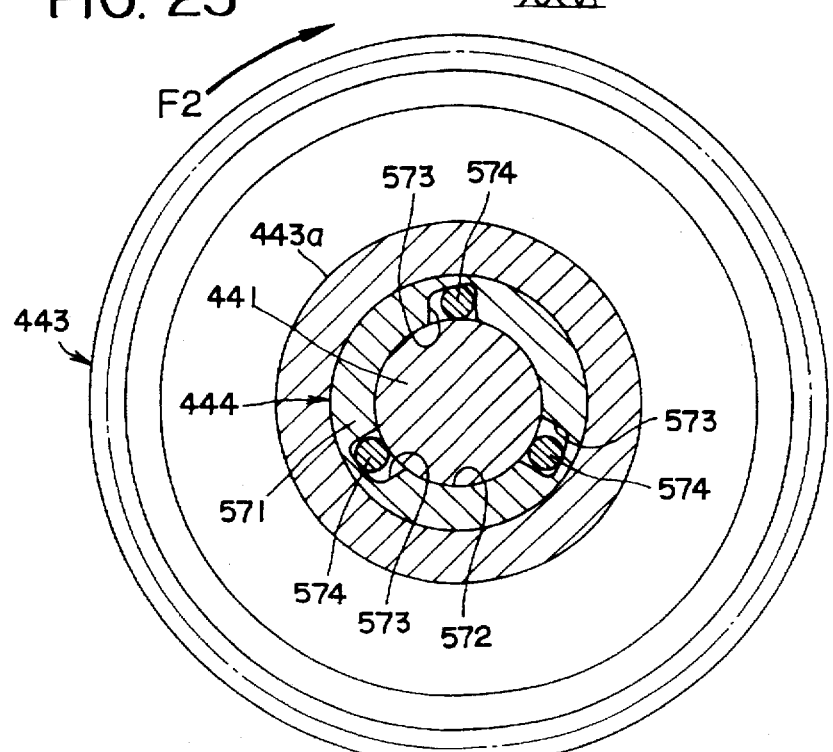
FIG. 26 is a view taken along the line XXVI—XXVI of FIG. 25.

Then, the one-way clutch 444 is provided on the inner circumference of the boss portion 443a. As shown in FIG. 26, the one-way clutch 444 is a type of wedge roller where, for example, the first intermediate shaft 441 is rotatably inserted into a center hole 572 of a clutch outer 571 which is press-fitted into the inner circumference of the boss portion 443a for rigid rotation therewith and clutch rollers 574 are provided at the interior of three wedge chambers 573 formed on the inner circumferential surface of the center hole 572. Each wedge chamber 573 is formed in the form of a wedge where the ceiling surface is higher toward the rotating direction F2 of the first intermediate shaft 441.

The length in the axial direction of the clutch outer 571 is equal to the total length of the boss portion 443a, and the length of the clutch roller 574 and wedge chamber 573 is set to about one half of the total length of the clutch outer 571, and the bearing roller trains 575, 576 are provided on both the left and right sides of the clutch roller 574. Accordingly, the primary driven gear 443 is rotatably supported about the first intermediate shaft 441 by the left and right bearing roller trains 575, 576 and, at the same time, is supported by the inner wall 425Ma of the center case 425M through the above described bearing 446.

At the time of operation of the electric motor 431, since the primary driven gear 443 is driven for rotation in the F2 direction by the primary drive gear 440, each clutch roller 574 within the one-way clutch 444 penetrates into the space between the ceiling surface of the wedge chamber 573 and the outer circumferential surface of the first intermediate shaft 441 in an attempt for rolling toward the direction along which the ceiling surface of the wedge chamber 573 is lowered, where the primary driven gear 443 and the primary intermediate shaft 441 rotate rigidly together due to such wedging effect. Therefore, the rotation in the F2 direction of the primary driven gear 443 is transmitted to the force combining device 455 through the gears of the secondary drive gear and after 448, 449, 450, 451.

Further, when the power assisted bicycle 1 is run only by a pedaling force without actuating the electric motor 431, the crank shaft 33 receiving the pedaling force, the force composition device 455 and the ternary driven gear 451 are rotated rigidly together with the drive sprocket 36 in the F1 direction so as to drive the rear wheel 26. At this time, the ternary drive gear 451 and the secondary driven gear 449 are driven backward in the R2 direction while the secondary drive gear 448 and the first intermediate shaft 441 are driven backward in the F2 direction.

However, since the electric motor 431 is not actuated, the primary drive gear 440 and primary driven gear 443 are halted. Since each clutch roller 574 within the one-way clutch 444 is rolled toward the direction along which the ceiling surface of the wedge chamber 573 is increased, the wedging effect of the clutch roller 574 is released and only the first intermediate shaft 441 is raced in the F2 direction whereby the primary driven gear 443 and the primary drive gear 440 are maintained in their halting state and the electric motor 431 is not driven backward.

In this manner, the boss portion 443a of the primary driven gear 443 is extended toward the bearing 446 of the first intermediate shaft 441, and the bearing 446 is provided on the outer circumference of the boss portion 443a while the one-way clutch 444 is provided on the inner circumference of the boss portion 443a. The first intermediate shaft 441 may thus be made shorter in length by bringing the bearing 446 and the one-way clutch 444 in an overlapping arrangement in the axial direction, and it is thereby possible to make narrower the width of the reduction gear train 452 so as to reduce the total width of the power assist apparatus 400.

In addition, since a relatively wide space may be provided for disposing the one-way clutch 444, the bearing roller trains 575, 576 may be provided on the two sides of the clutch roller 574 so as to achieve a smaller mechanical loss by greatly reducing the rotating resistance at the time of racing of the first intermediate shaft 441 within the primary driven gear 443. At the same time, occurrence of gear noise may be controlled to a low level by preventing an eccentricity or inclination of the first intermediate shaft 441 and secondary drive gear 448.

Figure 27:
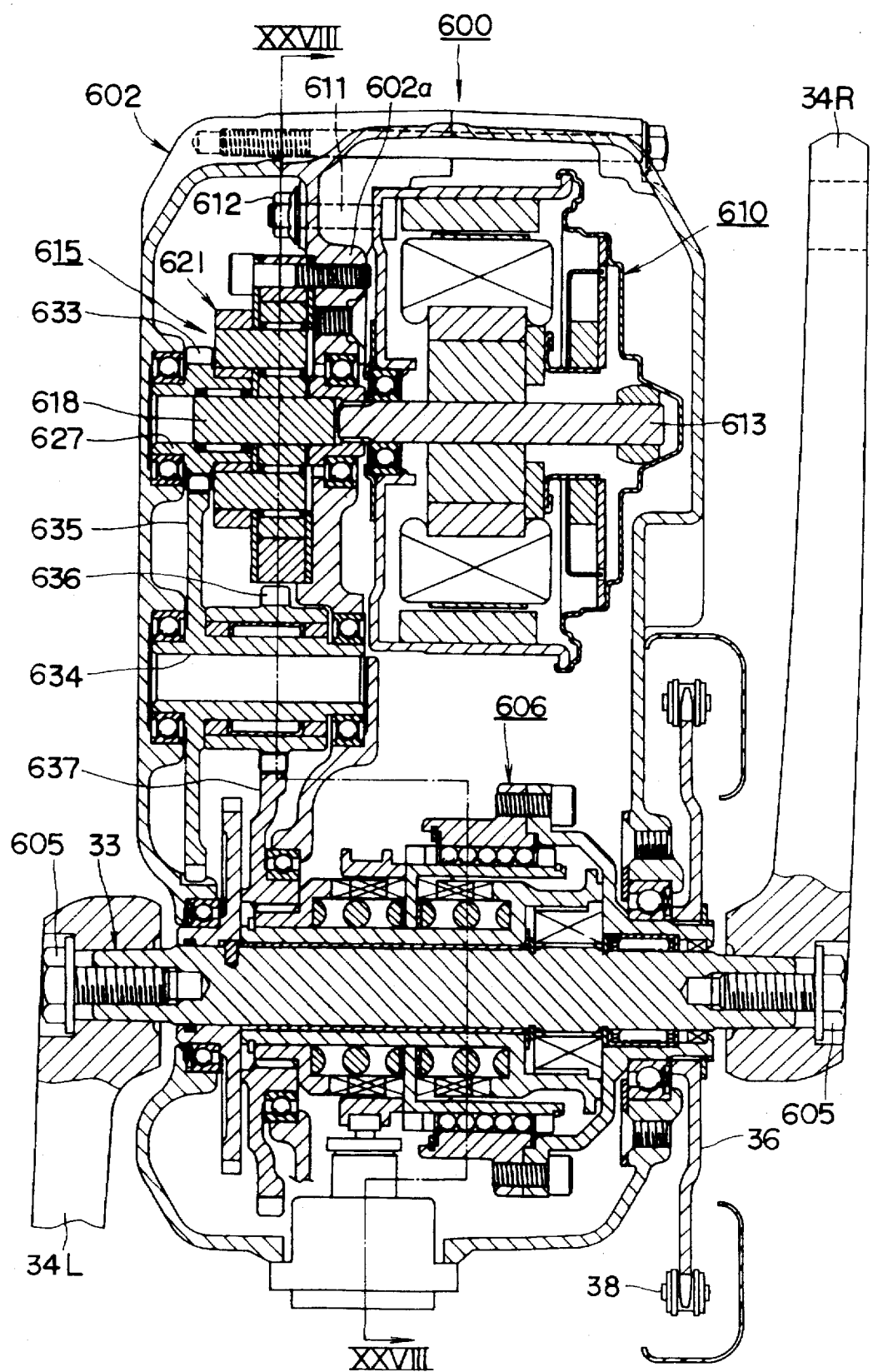
FIG. 27 is a cross sectional view of a power assist apparatus showing a fourth embodiment of the present invention.
Figure 28:
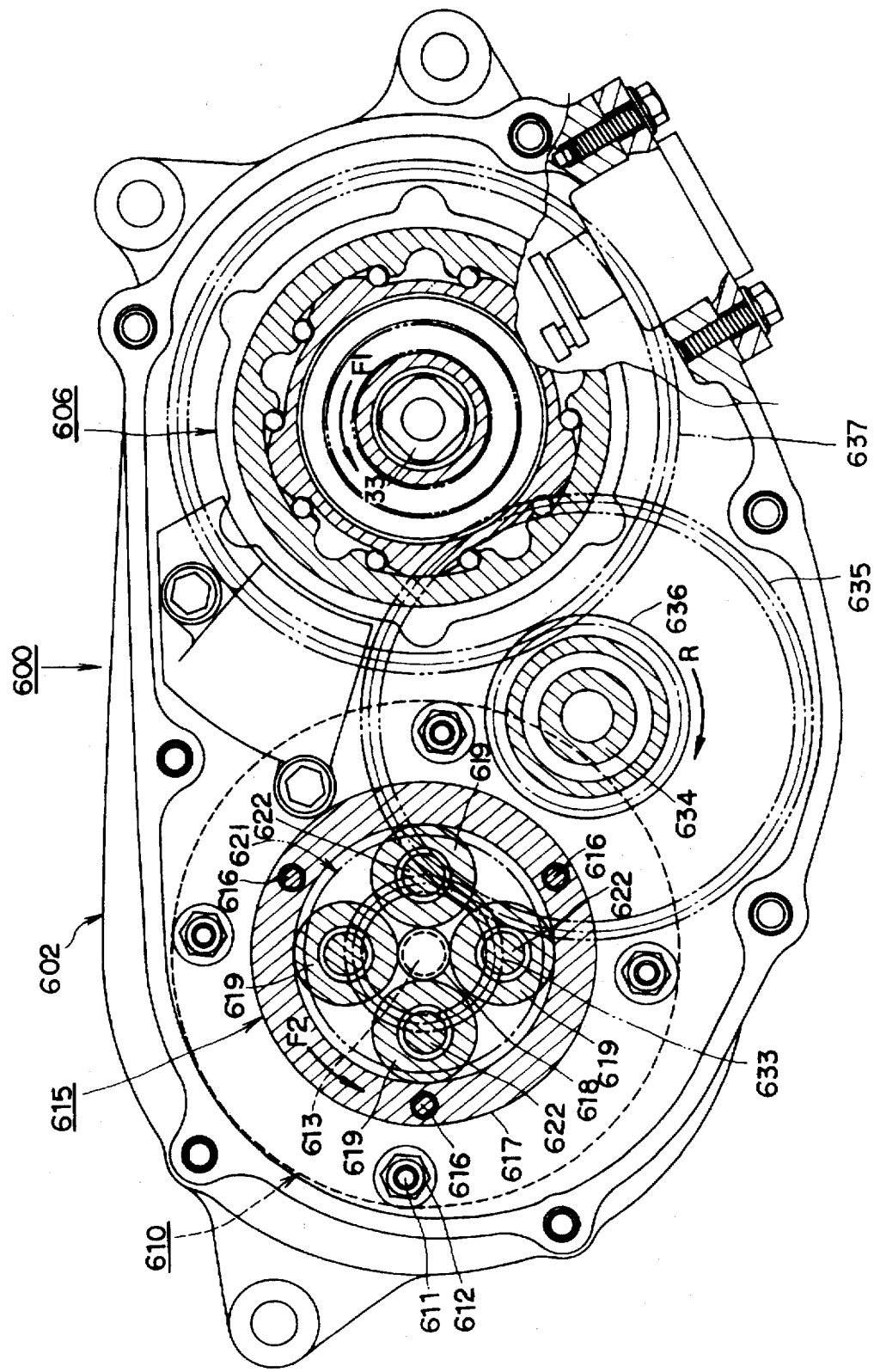
FIG. 28 is a longitudinal sectional view of the power assist apparatus taken along the line XXVIII—XXVIII of FIG. 27.

FIG. 27 is a cross sectional view of a power assist apparatus 600 showing a fourth embodiment of the present invention and FIG. 28 is a longitudinal sectional view of the power assist apparatus 600 as viewed along the line XXVIII—XXVIII of FIG. 27.

A crank shaft 33 is rotatably supported on a rear end portion of a casing 602 of the power assist apparatus 600, and the cranks 34L and 34R are fixed by means of bolts 605 to the two end portions of the crank shaft 33, and a force composition device 606 is provided on an intermediate portion of the crank shaft 33. A right end portion of the force composition device 606 is projected toward the right from a casing 602, and a drive sprocket 36 is provided on this portion. The main construction and operation of the force composition device 606 are identical to the force composition device 455 of the power assist apparatus 400 shown in FIG. 16 and will not be described.

On the other hand, an electric motor 610 is provided at a front portion of the interior of the casing 602. The electric motor 610 is fixed to the right side of an inner wall portion 602a formed within the casing 602 using motor fixing bolts 611 and nuts 612, and a main shaft 613 thereof is provided in parallel to the crank shaft 33. The main construction of the electric motor 610 is identical to the electric motor 431 of the power assist apparatus 400 shown in FIG. 16 and, hence, will not be described.

Then, a planetary speed reducing device 615 according to the present invention is disposed on the side opposite to the electric motor 610 of the inner wall portion 602a of the casing 602.

Figure 29:
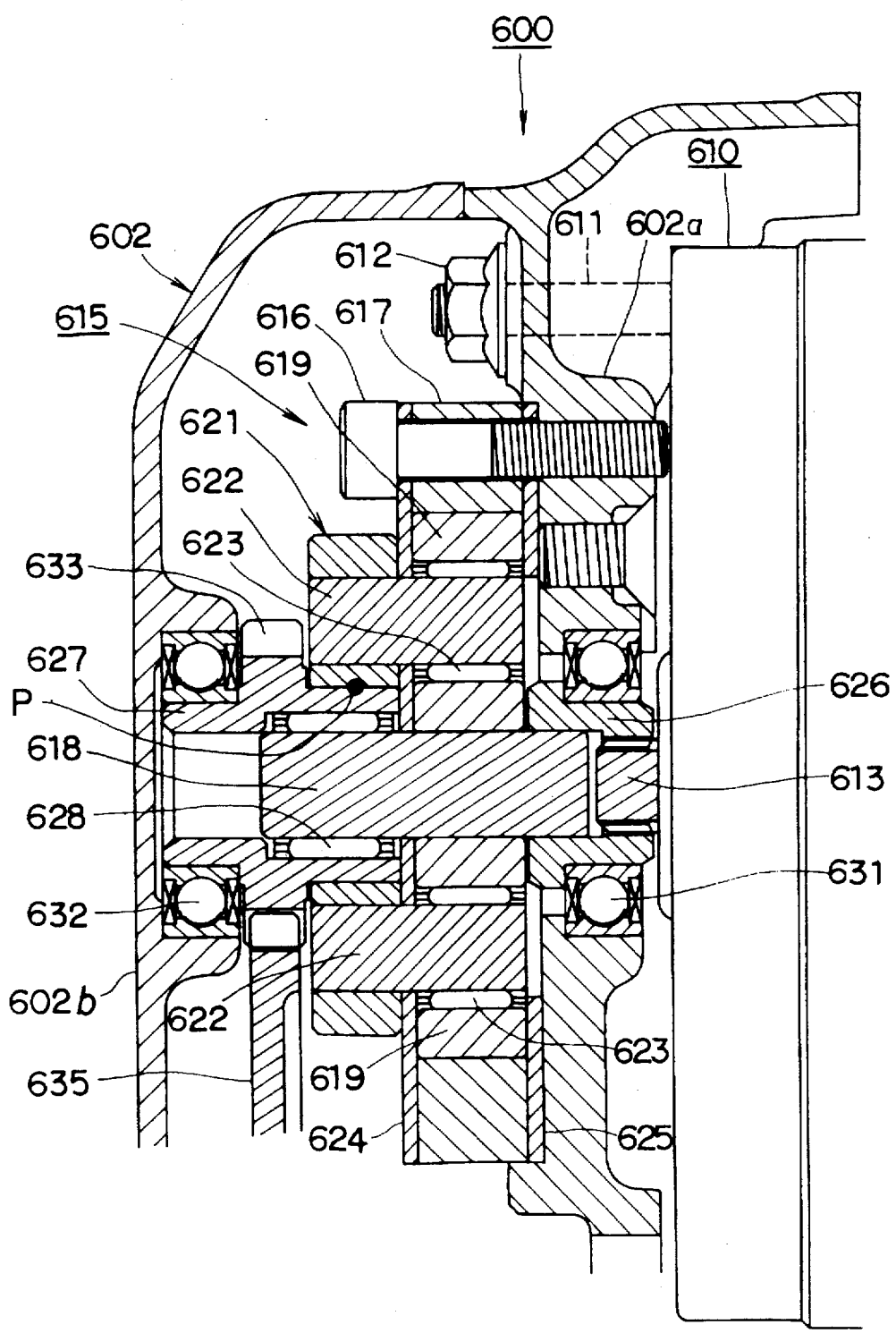
FIG. 29 is an enlarged view of the planetary speed reducing device shown in FIG. 27.

As shown in an enlarged view in FIG. 29, the planetary speed reducing device 615 comprises a ring roller 617 fixed by means of three bolts 616 to the inner wall portion 602a so as to be restricted of rotation, a sun roller 618 rotatably supported at the center of the ring roller 617, four planet rollers 619 placed somewhat like press fitting into the space between the inner circumferential surface of the ring roller 617 and the outer circumferential surface of the sun roller 618, and a reduction carrier 621 provided coaxially and relatively rotatably with respect to the sun roller 618.

Four roller shafts 622 parallel to the sun roller 618 are fixed to the reduction carrier 621, and the respective planet rollers 619 are supported on the roller shafts 622 through bearings 623. Cover plates 624, 625 cover the two side surfaces of the ring roller 617 and planet rollers 619.

A joint member 626 is fixed to an end portion on the electric motor 610 side of the sun roller 618 for rigid rotation therewith for example by means of press fitting. The joint member 626 is linked with the main shaft 613 of the electric motor 610 for rigid rotation therewith for example by means of spline coupling. It is also possible to form the joint member 626 integrally with the sun roller 618.

Further, a support shaft 627 is connected to an end portion opposite to the electric motor 610 of the sun roller 618. The support shaft 627 is formed for example into a stepped cylinder having an inner diametrical portion on the right side thereof being increased in diameter. The outer circumference of an end portion of the sun roller 618 is inserted into the enlarged-diameter inner diametrical portion through an intermediate bearing 628 of a type of needle bearing. The sun roller 618 and the support shaft 627 are maintained coaxially and relatively rotatably with respect to each other by means of the intermediate bearing 628.

The end portion on the electric motor 610 side of the sun roller 618 is supported by an end portion bearing 631 provided on the inner wall portion 602a of the casing 602, and the end portion on the side opposite to the sun roller 618 of the support shaft 627 is supported by an end portion bearing 632 provided on a left wall portion 602b of the casing 602.

Then, a primary drive gear 633 is integrally formed on an intermediate portion of the support shaft 627, and the reduction carrier 621 is press-fitted onto the outer circumference of the support shaft 627. Here, press-fitting portion P of the reduction carrier 621 is provided as shifted in the axial direction (toward the right) of the support shaft 627 with respect to the primary drive gear 633.

An intermediate shaft 634 is rotatably supported between the sun roller 618 and support shaft 627 and the crank shaft 33, and the intermediate shaft 634 has a large-diameter primary driven gear 635 and a small-diameter secondary drive gear 636 provided thereon. The primary driven gear 635 is meshed with the primary drive gear 633, and the secondary drive gear 636 is meshed with a secondary driven gear 637 provided on the left side of the force composition device 606.

When the main shaft 613 of the electric motor 610 is rotated, the sun roller 618 of the planetary speed reducing device 615 is rotated rigidly therewith so that each planet roller 619 revolves about the sun roller 618 while rotating on its own axis between the fixed ring roller 617 and the rotating sun roller 618. Thereby, the reduction carrier 621 and the primary drive gear 633 is driven for rotation at a reduced speed.

Then, the rotation of the primary drive gear 633 is transmitted to the secondary driven gear 637 through the primary driven gear 635 and the secondary drive gear 636. In this manner, the rotating force (assisting power) of the main shaft 613 of the electric motor 610 is input to the force composition device 606 after being subjected to three stages of speed reduction by the planetary speed reducing device 615 and the four pieces of gears 633, 635, 636, 637.

The force composition device 606 composes the rotating force (pedaling force) of the crank shaft 33 and the assisting power of the electric motor 610 in a well-balanced manner and outputs the composed force thereof to the drive sprocket 36 to drive the rear wheel 26 of the power assisted bicycle 1.

As described above, the planetary speed reducing device 615 in the present embodiment is constructed such that the support shaft 627 is connected coaxially and relatively rotatably to one end of the sun roller 18 through the intermediate bearing 628, the reduction carrier 621 and the primary drive gear 633 are provided on the support shaft 27 for rigid rotation therewith, and the end portion toward the electric motor 10 of the sun roller 618 and the outer end portion of the support shaft 627 are supported by means of the end portion bearings 631, 632, respectively.

For this reason, the end portion on the side opposite to the electric motor 610 of the sun roller 618 is supported doubly by the intermediate bearing 628 and the left side end portion bearing 632. The axis of the sun roller 618 is somewhat movable in a direction perpendicular to the axial direction as a result of a multiplying effect of the bearing clearances of the two bearings 628, 632.

Accordingly, for example, even when the center position of the ring roller 617 is slightly eccentric with respect to the end portion bearings 631, 632, the eccentricity of the ring roller 617 is absorbed by a displacement of the axis of the sun roller 618 so that the sun roller 618 can be rotated smoothly. For this reason, the positioning precision of the ring roller 17 need not be extremely high and, in addition, assembling of the planetary speed reducing device 615 does not require each component part to be assembled while confirming the rotating characteristic of the sun roller 618. Thus, the assembling operation can be made easy.

Further, since, as described, the displacement of axis of the sun roller 618 becomes possible as a result of the multiplying effect of the bearing clearances of the intermediate bearing 632 and the left side end portion bearing 632, the bearing clearance of its own of each bearing 628, 631, 632 can be smaller. For this reason, an occurrence of bearing noise or an occurrence of gear noise due to an eccentric rotation of the primary drive gear 633 can be controlled to a low level.

Furthermore, in the planetary speed reducing device 615, the primary drive gear 633 is formed integrally with the support shaft 627 and the reduction carrier 621 is press-fitted onto the outer circumference of the support shaft 627. Since the press-fitting portion P of the reduction carrier 621 is provided as shifted in the axial direction of the support shaft 627 with respect to the primary drive gear 633, no deformation occurs of teeth of the primary drive gear 633 due to press-fitting pressure of the reduction carrier 621. Therefore, an occurrence of gear noise of the primary drive gear 633 can be prevented.

What is claimed is:

1. A power assist apparatus of a power assisted bicycle comprising:

a crank shaft to be driven for rotation by a pedaling force;

an electric motor for generating an assisting power;

a force composition device for composing the pedaling force and assisting power to output a composed force to a driving wheel side and at the same time for generating two thrust component forces having magnitude proportional to pedaling force and assisting power;

a thrust component force magnitude difference detection means for detecting the difference in magnitude between said two thrust component forces; and a control means for controlling an output of the electric motor so as to bring the difference in magnitude between said two thrust component forces to "0" and to an optional magnitude difference based on an input from the thrust component force magnitude difference detection means.

2. A power assist apparatus of the power assisted bicycle according to claim 1, wherein said force composition device comprising:

an output rotating member for transmitting an output toward the driving wheel;

a force composition rotating member provided to be rigidly rotatable with the output rotating member and axially movable with respect thereto;

a pedaling force transmitting member and an assisting power transmitting member supported on two sides of the force composition rotating member and rotated in the same direction upon receiving the pedaling force and the assisting power, respectively;

torque cams for transmitting the rotating forces of the pedaling force transmitting member and the assisting power transmitting member to the force composition rotating member and at the same time for causing two thrust component forces having magnitude proportional to the pedaling force and the assisting power to act on the force composition rotating member from two sides thereof; and coil springs for urging the force composition rotating member to a neutral position on the output rotating member, wherein said thrust component force difference detection means comprises a position sensor for detecting and inputting to the control means displacement direction and displacement amount of the force composition rotating member from the neutral position.

3. A power assist apparatus of the power assisted bicycle according to claim 2, wherein said output rotating member is constructed in shape of a cylinder provided rotatably on an outer circumference of said crank shaft.

4. A power assist apparatus of a power assisted bicycle according to claim 1, further comprising a reduction gear train to reduce the assisting power of the electric motor and transmit said assisting power to the force composition device, said reduction gear train being provided with:

an intermediate shaft disposed parallel to and between a main shaft of the electric motor and the crank shaft; and a gear supported on said intermediate shaft through a one-way clutch;

wherein said intermediate shaft is supported by bearings at two ends thereof, and said gear is provided with a boss portion extending toward a first of said bearings, said first bearing being provided on an outer circumference of said boss portion and said one-way clutch being provided on an inner circumferences of said boss portion.

5. A power assist apparatus of a power assisted bicycle including a crank shaft to be driven for rotation by a pedaling force, an electric motor for generating an assisting power, and a force composition device for composing the pedaling force and assisting power to output the composed force thereof to a driving wheel side, said force composition device comprising:

an output rotating member supported on the crank shaft to transmit a composed force of the pedaling force and the assisting power to the driving wheel side;

a force composition rotating member provided on the output rotating member through a ball spline to be rigidly rotatable therewith and axially movable with respect thereto;

torque cams for transmitting pedaling force and assisting power to the force composition rotating member and at the same time for causing two thrust component forces having magnitude proportional to the pedaling force and the assisting power to act on the force composition rotating member from two side thereof along the axial direction of the crank shaft; and coil springs for maintaining the force composition rotating member at a neutral position in a range of movement thereof in the axial direction, said coil springs being positioned on an inner circumferential side in the diametrical direction than said torque cams; and said power assist apparatus of the power assisted bicycle further comprising:

a movement detection means for detecting displacement direction and displacement amount from the neutral position of the force composition rotating member moved in the axial direction upon receiving said two thrust component forces; and a control means for detecting the difference in magnitude between said two thrust component forces based on an input from the movement detection means and for controlling an output of the electric motor so as to bring the difference in magnitude to "0" and to an optional magnitude difference.

6. A power assist apparatus of the power assisted bicycle according to claim 5, wherein the ball spline of the force composition device is disposed on an outer circumferential side in the diametrical direction than the torque cams and the coil springs.

7. A power assist apparatus of a power assisted bicycle according to claim 5, further comprising a reduction gear train to reduce the assisting power of the electric motor and transmit said assisting power to the force composition device, said reduction gear train being provided with:

an intermediate shaft disposed parallel to and between a main shaft of the electric motor and the crank shaft; and a gear supported on said intermediate shaft through a one-way clutch;

wherein said intermediate shaft is supported by bearings at two ends thereof, and said gear is provided with a boss portion extending toward a first of said bearings, said first bearing being provided on an outer circumference of said boss portion and said one-way clutch being provided on an inner circumferences of said boss portion.

8. A power assist apparatus of a power assisted bicycle including a crank shaft to be driven for rotation by a pedaling force, an electric motor for generating an assisting power, and force composition device for composing the pedaling force and assisting power to output a composed force thereof to a driving wheel side, said force composition device comprising:

an output rotating member supported on the crank shaft to transmit a composed force of the pedaling force and the assisting power to the driving wheel side;

a force composition rotating member provided to be rigidly rotatable with said output rotating member and axially movable with respect thereto through a ball spline;

a pedaling force transmitting member for transmitting a pedaling force to the force composition rotating member;

an assisting power transmitting member for transmitting an assisting power to the force composition rotating member;

a torque cam for transmitting the pedaling force from said pedaling force transmitting member to the force composition rotating member and at the same time for causing a thrust component force having magnitude proportional to pedaling force to act on the force composition rotating member from one side thereof along the axial direction of the crank shaft;

a torque cam for transmitting the assisting power from said assisting power transmitting member to the force composition rotating member and at the same time for causing a thrust component force having magnitude proportional to assisting power to act on the force composition rotating member from the other side thereof along the axial direction of the crank shaft;

coil springs for maintaining the force composition rotating member at a neutral position in a range of movement thereof in the axial direction;

a movement detection means for detecting displacement direction and displacement amount from the neutral position of the force composition rotating member moved in the axial direction upon receiving said two thrust component forces; and a control means for detecting the difference in magnitude between said two thrust component forces based on an input from said movement detection means and for controlling an output of the electric motor to bring the difference in magnitude to "0" and to an optional difference in magnitude; and said torque cam and torque cam comprising cam rollers rotatably provided on the pedaling force transmitting member and the assisting power transmitting member, respectively, and having rotating axis orthogonal to the crank shaft and cam grooves formed in a spiral direction on the force composition rotating member for engagement with said cam rollers.

9. A power assist apparatus of the power assisted bicycle according to claim 8, wherein a bearing surface provided on the pedaling force transmitting member and another bearing surface provided on the assisting power transmitting member are positioned with a separation from each other in the axial direction of the crank shaft, said force composition rotating member being supported so as to extend between the two bearing surfaces.

10. A power assist apparatus of the power assisted bicycle according to claim 8, wherein said force composition rotating member is formed to have a ball spline constituting portion thereof and a cam constituting portion thereof as separate members from each other, the ball spline constituting portion and the cam constituting portion being assembled with each other by means of screws.

11. A power assist apparatus of the power assisted bicycle according to claim 10, wherein the ball spline constituting portion and screw tightening portion of said force composition rotating member are positioned on an outer circumference of the bearing surface of said pedaling force transmitting member.

12. A power assist apparatus of a power assisted bicycle according to claim 8, further comprising a reduction gear train to reduce the assisting power of the electric motor and transmit said assisting power to the force composition device, said reduction gear train being provided with:

an intermediate shaft disposed parallel to and between a main shaft of the electric motor and the crank shaft; and a gear supported on said intermediate shaft through a one-way clutch;

wherein said intermediate shaft is supported by bearings at two ends thereof, and said gear is provided with a boss portion extending toward a first of said bearings, said first bearing being provided on an outer circumference of said boss portion and said one-way clutch being provided on an inner circumferences of said boss portion.

13. A power assist apparatus of a power assisted bicycle including an electric motor provided at the interior of a casing, said power assist apparatus comprising:

a motor fixing bolt inserted into an attaching seat surface provided on an end portion of an outer case of said electric motor from an inner side of the electric motor, said motor fixing bolt being restricted of movement in the axial direction and rotation with respect to said outer case, said motor fixing bolt being caused to penetrate through an electric motor fixing wall portion provided within said casing, and a nut tightened onto the motor fixing bolt from the opposite side of said electric motor fixing wall portion to secure the electric motor at the interior of the casing.

14. A power assist apparatus of the power assisted bicycle according to claim 13, wherein said motor fixing bolt is positioned between a plurality of magnets provided on an inner circumferential portion of the outer case of said electric motor.

15. A power assist apparatus of the power assisted bicycle according to claim 13, wherein said motor fixing bolt is positioned on an outermost circumferential portion of said attaching seat surface, and one side surface of a head portion of the motor fixing bolt is brought close to an inner circumferential surface of the outer circumferential wall of the outer case of the electric motor to restrict a rotation of the motor fixing bolt.

16. A power assist apparatus of a power assisted bicycle including a casing for accommodating an electric motor comprising a center case positioned at a center portion in the direction of width of the bicycle body, and two side cases secured to left and right sides of the center case by case fixing bolt, a drive sprocket for driving a driving wheel being provided on one side of the casing, wherein a female thread is formed on an inner side of the side case positioned opposite to said drive sprocket and said case fixing bolt is inserted from the side case on the drive sprocket side to penetrate through the center case and tightened into said female thread to secure the center case and left and right side cases to each other.

17. A power assist apparatus of a power assisted bicycle including a planetary speed reducing device comprising a sun roller rotatably supported at a center of a ring roller restricted of rotation, a plurality of planet rollers placed between an inner circumferential surface of said ring roller and an outer circumferential surface of the sun roller, a reduction carrier for supporting the planet rollers provided as coaxially and relatively rotatable with the sun roller, and a primary drive gear fixed to the reduction carrier for rigid rotation therewith, said power assist apparatus further comprising:

a support shaft connected to one end of said sun roller;

an intermediate bearing provided between the support shaft and the sun roller to maintain the sun roller and the support shaft coaxially and relatively rotatable with respect to each other; and end portion bearings for respectively supporting the end portion opposite to the support shaft of the sun roller and the end portion opposite to the sun roller of the support shaft, wherein said reduction carrier and the primary drive gear provided on the support shaft for rigid rotation therewith.

18. A power assist apparatus of the power assisted bicycle according to claim 17, wherein said primary drive gear is integrally formed on the support shaft and said reduction carrier is press-fitted onto an outer circumference of the support shaft with press-fitted portion of the reduction carrier being provided as shifted with respect to the primary drive gear in the axial direction of the support shaft.

19. A power assist apparatus of a power assisted bicycle including a crank shaft to be driven for rotation by a pedaling force, an electric motor for generating an assisting power, and force composition device for composing the pedaling force and the assisting power to output a composed force thereof to a driving wheel side, said force composition device comprising:

a substantially circular cylindrical pedaling force transmitting member supported rotatably and axially stationarily on the crank shaft and having a clutch housing formed on one end thereof;

a one-way clutch provided within said clutch housing for transmitting only a rotation in a forward rotating direction of the crank shaft to the pedaling force transmitting member;

an assisting power transmitting member supported rotatably and axially stationarily on the outer circumference of an end portion toward the side opposite to the clutch housing of said pedaling force transmitting member for receiving an assisting power from the electric motor;

an output rotating member supported rotatably and axially stationarily on the crank shaft for transmitting a composed force of the pedaling force and the assisting power to the driving wheel side;

a force composition rotating member provided on said output rotating member through a ball spline for rigid rotation therewith and axial movement with respect thereto;

torque cams for transmitting the pedaling force and the assisting power to said force composition rotating member and at the same time for causing two thrust component forces having magnitude proportional to pedaling force and assisting power to act on the force composition rotating member from two sides thereof along the axial direction of the crank shaft;

a pair of coil springs for maintaining the force composition rotating member at a neutral position within a range of axial movement thereof by urging an energizing portion of the force composition rotating member from the two sides thereof in the axial direction of the crank shaft; and a position sensor for detecting displacement amount and displacement direction from the neutral position of the force composition rotating member moved in the axial direction upon receiving said two thrust component forces, said pair of coil springs being charged into the space between the clutch hosing of said pedaling force transmitting member and the assisting power transmitting member so as to position the energizing portion of the force composition rotating member between the two coil springs, and said power assist apparatus further comprising a control means for detecting the difference in magnitude between the two thrust component forces based on an input from said position sensor and for controlling an output of the electric motor so as to bring the difference in magnitude to "0" and to an optional magnitude difference.

20. A power assist apparatus of the power assisted bicycle according to claim 19, wherein the output rotating member is supported on the crank shaft next to the pedaling force transmitting member and the pedaling force transmitting member is linked with the output rotating member for relative rotation therewith and so as to keep contact therebetween in the axial direction.

21. A power assist apparatus of a power assisted bicycle according to claim 19, further comprising a reduction gear train to reduce the assisting power of the electric motor and transmit said assisting power to the force composition device, said reduction gear train being provided with:

an intermediate shaft disposed parallel to and between a main shaft of the electric motor and the crank shaft; and a gear supported on said intermediate shaft through a one-way clutch;

wherein said intermediate shaft is supported by bearings at two ends thereof, and said gear is provided with a boss portion extending toward a first of said bearings, said first bearing being provided on an outer circumference of said boss portion and said one-way clutch being provided on an inner circumferences of said boss portion.

* * * * *